US012783555B1

(12) United States Patent
Pappas et al.

(10) Patent No.: US 12,783,555 B1
(45) Date of Patent: Nov. 3, 2026

(54) ITERATIVE ENHANCEMENT OF ARTIFICIAL INTELLIGENCE MODELS USED FOR CONTENT MODERATION

(71) Applicant: Amazon Technologies, Inc., Seattle, WA (US)

(72) Inventors: Nikolaos Pappas, Seattle, WA (US); Srikanth Doss Kadarundalagi Raghura, Lynnwood, WA (US); Min Bai, Jersey City, NJ (US); Ren Pang, Secaucus, NJ (US); Sandesh Swamy, Seattle, WA (US); Yanjun Qi, McLean, VA (US); Xiaofei Ma, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/263,320

(22) Filed: Jul. 8, 2025

(51) Int. Cl.
*G06F 16/20* (2019.01)
*G06F 16/28* (2019.01)

(52) U.S. Cl.
CPC .................................. *G06F 16/285* (2019.01)

(58) Field of Classification Search
CPC ..................................................... G06F 16/285
See application file for complete search history.

(56) References Cited

U.S. PATENT DOCUMENTS 10,962,939 B1 * 3/2021 Das ...................... G05B 13/029
2024/0428783 A1 * 12/2024 Gupta ..................... G06F 40/16
2026/0010562 A1 * 1/2026 Peterson ............... G06F 16/355

OTHER PUBLICATIONS

Ke-Li Chiu, et al., "Detecting Hate Speech with GPT-3," arXiv:2103.12407v4, Mar. 2022, pp. 1-29.
Edward Hu, et al., "Lora: Low-Rank Adaptation of Large Language Models," arXiv:2106.09685v2, Oct. 2021, pp. 1-26.
Vivian Lai, et al., "Human-AI Collaboration via Conditional Delegation: A Case Study of Content Moderation," arXiv:2204.11788v1, Apr. 2022, pp. 1-18.
Xinlei He, et al., "You Only Prompt Once: On the Capabilities of Prompt Learning on Large Language Models to Tackle Toxic Content," (To Appear in the 45th IEEE Symposium on Security and Privacy, May 20-23, 2024.), arXiv:2308.05596v1, Aug. 2023, pp. 1-19.
Deepak Kumar, et al., "Watch Your Language: Investigating Content Moderation with Large Language Models," arXiv:2309.14517v2 [cs.HC] Jan. 17, 2024, pp. 1-12.
"Quickstart: Analyze multimodal content (preview)," Azure A/Services/Microsoft Learn, Mar. 26, 2025, retrieved from https://learn.microsoft.com/en-us/azure/ai-services/content-safety/quickstart-multimodal, pp. 1-5.

(Continued)

*Primary Examiner* — Kristopher Andersen
(74) *Attorney, Agent, or Firm* — Robert C. Kowert; Kowert, Hood, Munyon, Rankin & Goetzel, P.C.

(57) ABSTRACT

A content moderator which includes an artificial intelligence model is iteratively enhanced. An enhancement iteration comprises generating synthesized content units based on analysis of content units which were erroneously labeled by a first version of the moderator, and transforming the first version to a second version by training the first version on the synthesized content units. From among labeled content items generated by the second version, additional erroneously labeled content items are identified for analysis in a subsequent iteration.

20 Claims, 16 Drawing Sheets

(56) References Cited

OTHER PUBLICATIONS

Yu Wang, et al., "Jailbreak Large Vision-Language Models Through Multi-Modal Linkage," arXiv:2412.00473v3 [cs.CV] Dec. 7, 2024, pp. 1-26.
Google Cloud, "Detect explicit content (SafeSearch)," Cloud Vision API, retrieved on Jun. 16, 2025 from https://cloud.google.com/vision/docs/detecting-safe-search, pp. 1-9.
OpenAI Platform, "Moderation," retrieved Jun. 16, 2025 from https://platform.openai.com/docs/guides/moderation/content-classifications, pp. 1-7.
Mirko Franco, et al., "Analyzing the Use of Large Language Models for Content Moderation with ChatGPT Examples," In 3rd International Workshop on Open Challenges in Online Social Networks (OASIS '23), Sep. 4, 2023, Rome, Italy. ACM, New York, NY, USA, 13 pages. https://doi.org/10.1145/3599696.3612895, pp. 1-14.
"SiyinWang, et al., ""Safe Inputs but Unsafe Output: Benchmarking Cross-modality Safety Alignment of Large Vision-Language Models,"" arXiv:2406.15279v2 [cs.AI] Feb. 17, 2025, pp. 1-43."
U.S. Appl. No. 19/263,328, filed Jul. 8, 2025, Nikolaos Pappas, et al.

* cited by examiner

Table 1005

| Unacceptable subject matter category | Example filtering strength (e.g., selected by FM owner/ user) | Example target accuracy metrics | |
|---|---|---|---|
| | | False positive rate (blocking rate of acceptable content) | Recall (blocking rate of unacceptable content) |
| USMC A | Low | Less than 0.2% | Greater than 50% |
| | Medium | Less than 0.5% | Greater than 70% |
| | High | Less than 1% | Greater than 90% |
| USMC B | Low | Less than a% | Greater than d% |
| | Medium | Less than b% | Greater than e% |
| | High | Less than c% | Greater than f% |
| USMC C | Low | Less than a'% | Greater than d'% |
| | Medium | Less than b'% | Greater than e'% |
| | High | Less than c'% | Greater than f'% |
| ... | ... | ... | ... |

Confidence thresholds 1010 to use for respective filtering strengths and USMCs may be computed, e.g., by determining points on ROC curves (plotted for validation data sets) that are closest to target accuracy metrics

*FIG. 10*

ITERATIVE ENHANCEMENT OF ARTIFICIAL INTELLIGENCE MODELS USED FOR CONTENT MODERATION

BACKGROUND

Foundation models and other generative artificial intelligence models (GAIMs) hosted in cloud computing environments are increasingly being used for a variety of applications accessible by end users, such as general purpose question answering, chatbots, content summarization and the like. The owners of such hosted foundation models may wish to ensure that the input prompts provided by the end users to such foundation models, and/or the corresponding output produced by the foundation models, is moderated so that content acceptability criteria are satisfied. Especially in scenarios in which the content to be moderated is multimodal (e.g., comprising text in combination with non-text components such as images), determining whether the content is acceptable or unacceptable can present a non-trivial technical challenge.

BRIEF DESCRIPTION OF DRAWINGS

FIG. 10 illustrates an example scenario in which confidence level thresholds for labels generated by a content moderator of a foundation model may be chosen based on filtering strengths settings for unacceptable subject matter categories, according to at least some embodiments.

Figure 1:
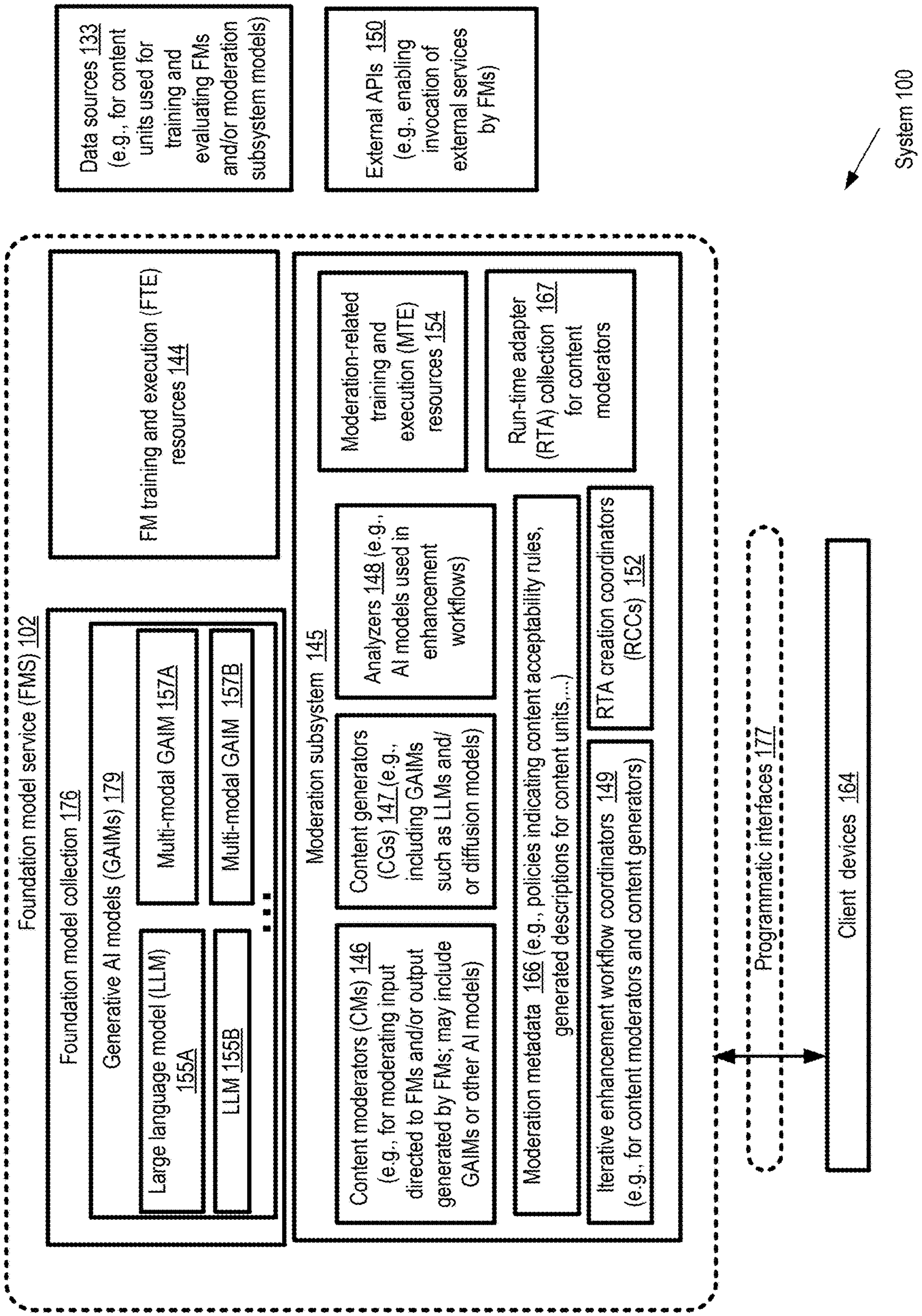
FIG. 1 illustrates an example system environment in which content moderators for foundation models may be iteratively enhanced using synthesized content, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for continuously improving content moderators (CMs) for input prompts and/or responses generated by foundation models (FMs) (and/or other types of artificial intelligence models) such as multi-modal generative artificial intelligence models (GAIMs) hosted at cloud computing environments. Content moderators CMs, which may also comprise one or more artificial intelligence models including GAIMs, may act as intermediaries in interactions between the FMs and end users of FMs, blocking content from the end users or the FMs which violates content moderation policies (e.g., policies comprising or indicating acceptability rules which prohibit content containing representations of gratuitous violence and the like). In various embodiments, the quality of the CMs may be iteratively enhanced, e.g., by training new versions of the CMs using content units that are synthesized based at least partly on analysis of errors made by earlier versions of the CMs. By iteratively synthesizing new training data for a CM based on analysis of erroneously labeled content units, the ability of the CM to handle content which is closer to the boundary between acceptability and unacceptability may be gradually strengthened, such that the numbers of erroneous labels are reduced over time. The quality of the AI models of content generators (CGs) which synthesize the content items may also be iteratively enhanced in at least some embodiments, e.g., by training new versions of CG models using examples of content units (with associated text descriptions) that are non-trivial to generate, and have been labeled collectively by a group of CMs including a CM which is also being iteratively enhanced. Both CMs and CGs may thus be continuously improved via interlinked enhancement iterations in various embodiments. CM enhancement iterations may be conducted asynchronously with respect to CG enhancement iterations in at least some embodiment, although some of the models and content artifacts involved may be common to both types of enhancement iterations.

Note that while much of this document uses FMs as the primary examples of destinations or sources of content which is to be moderated by CMs, the techniques introduced herein may be used in various embodiments for CMs that are used for moderating content sent to or from a variety of entities or systems, and are not restricted to CMs used as intermediaries for interactions between FMs and their end users. For example, the CMs may be used to moderate content sent to (or created by) various other types of AI models (including but not necessarily limited to AI models hosted at cloud computing environments), content sent to/from social media services, content sent to/from online forums or the like.

The term content unit, as used herein, may refer in various embodiments to a set of data with respect to which a label (or multiple labels, each corresponding to a different type of unacceptable subject matter) indicating unacceptability or acceptability is to be generated, such as a combination of text tokens and an image. Some content units may be multi-modal in that they may include a combination of content of several modalities such as text, images, videos and the like; other content units may be unimodal in that they comprise content of only a single mode.

The present disclosure also relates to methods and apparatus for dynamically adapting or adjusting CMs at run-time, e.g., by modifying weights based on attributes of the content which is to be analyzed for acceptability. The workload of a CM may comprise moderation tasks of numerous types, with the task types differing from one another, for example, in the specific set of content acceptability rules which are to be applied, the type of source of the content units to be moderated (e.g., whether the content units comprise text or images manually input by a human, text or images generated by a GAIM, etc.), and/or other properties or attributes. Using groups of example content units corresponding to each of a plurality of such content moderation task types, respective run-time adapters (RTAs) may be trained or generated for a GAIM of a CM in some embodiments. Some such RTAs may comprise a low-rank vector or matrix which can be used to modify the weights of the GAIM at run-time, e.g., to help the GAIM perform a particular type of content moderation task. The groups of content units used for generating, training or learning the RTAs may differ from one another in the acceptability rules or policies which are to be applied to members of the groups in at least some embodiments—e.g., a particular rule which applies to content units of one group may not be applicable to content units of another group. During preparation of the RTAs, a set of baseline weights that were learned for the GAIM during one or more earlier phases of training or fine-tuning may be kept frozen or unchanged in various embodiments. When a particular content unit is to be labeled (e.g., as part of content moderation task obtained at or transmitted to the CM), in some embodiments the appropriate combination of one or more RTAs (e.g., a subset of the collection of RTAs that were generated earlier) for that task may be identified dynamically and used to prepare a moderation result comprising a label indicating unacceptability or acceptability.

In at least some embodiments, when preparing or providing a moderation result comprising a label indicating acceptability or unacceptability, the CM may verify that a confidence level associated with the result or label matches or exceeds a confidence threshold. The confidence threshold itself may be chosen dynamically at run-time, e.g., based on the type of content unit or moderation task, user-specified filtering strengths associated with acceptability rules which are being enforced, and so on in different embodiments. The confidence level may be computed based at least in part on a context-dependent probability of occurrence of one or more tokens produced by a GAIM of the CM for the moderation task being performed.

More and more applications have come to rely on machine learning models such as large language models (LLMs), multi-modal language models such as vision language models or other types of foundation models (FMs), collectively also referred to as generative artificial intelligence models (GAIMs). Some FMs may have billions of parameters and are pre-trained using large corpora of publicly available data, enabling the models to learn about language in general and perform extremely well on generic tasks such as question answering, multi-turn conversations and the like. After their pre-training, FMs may be fine-tuned to perform specific types of tasks in some cases, e.g., to answer questions more accurately about specific problem domains. Some FMs may be deployed using resources of cloud computing environments or provider networks, e.g., on behalf of customers of the cloud computing environment that have developed or fine-tuned the FMs for specific types of applications. Such customers may be referred to as owners of the deployed FMs. In various embodiments, FM owners may wish to ensure that the input prompts provided to the deployed FMs, and the output or results provided by the FMs to such prompts, abide by an owner-approved content moderation policy. A content moderation policy, which may also be referred to as a content acceptability policy, may for example specify, describe or define one or more unacceptable or unsafe subject matter categories (USMCs) and/or associated subcategories. In some embodiments, a content moderation policy may comprise a single content acceptability rule pertaining to a particular USMC, such as the logical equivalent of "detect and block content which depicts or describes gratuitous violence"; as a result, there may be a one-to-one correspondence between policies and acceptability rules in such cases. In other embodiments, a given content moderation policy may have several acceptability rules, e.g., different rules for different USMCs, different rules for different modalities, etc., so there may be a 1-to-N relationship between policies and acceptability rules. Corresponding to a given USMC of a policy, one or more content modalities (e.g., text, images, audio and the like) which are to be checked for acceptability, as well as the filter strengths to be applied to eliminate or block the unacceptable content, may be chosen by the FM owner in at least some embodiments.

While AI models used for content moderation have been improving in the quality of their labeling, the task of labeling a given content unit as acceptable or unacceptable remains challenging, particularly when one takes interactions among multiple content modalities into account. For example, in some cases, a given content unit may include text which by itself may be deemed unacceptable according to a given policy, but an image which accompanies the text within the content unit may make the combination of the text and the image acceptable. The challenge of content moderation is further complicated when one has to take into account diverse (and sometimes evolving) combinations of unacceptable subject matter categories, cultural norms of different countries or regions, different media formats which may be used for content units, and so on. The techniques proposed herein may enable a content moderation subsystem or service to overcome such challenges, e.g., by continuous enhancement of the CM models, and by efficiently creating new RTAs that can be combined dynamically for different types of moderation tasks.

As one skilled in the art will appreciate in light of this disclosure, certain embodiments may be capable of achieving various advantages, including some or all of the following: (a) ensuring that unacceptable FM prompts, including prompts that attack an FM by attempting to make the FM perform operations which the FM owners did not intent the FMs to perform, are identified with high accuracy and high confidence and blocked before they reach FMs, (b) ensuring that unacceptable FM responses, which could potentially (e.g., if publicized) cause reputational harm and/or negative business consequences for FM owners, are also identified with high accuracy and high confidence and blocked and/or (c) reducing the amount of resources needed to ensure that content moderators for FM prompts/responses can moderate content according to a diverse set of policies/rules is reduced substantially, e.g., relative to some conventional approaches in which policies are hard-coded.

According to some embodiments, a system may include one or more computing devices. The computing devices may include instructions that upon execution on or across the one or more computing devices conduct or perform a plurality of enhancement iterations of or to a particular content moderator (CM) which comprises at least one generative artificial intelligence model (GAIM). In at least one embodiment, the particular CM may be the CM which is deployed for production use to moderate input and output of an FM hosted at a cloud computing environment. A given enhancement iteration of the particular CM may comprise grouping a collection of erroneously labeled content units into a plurality of clusters in various embodiments. Labels for individual content units of the collection may have been assigned by a first version of the particular CM in various embodiments, e.g., an initial version generated prior to commencement of the iterations, or a version which was trained at least in part using synthesized content units generated in a prior enhancement iteration. A given label assigned to a particular content unit may indicate whether the particular content unit violates one or more content acceptability rules of a moderation policy associated with the particular CM in at least some embodiments. Content units of a particular cluster of the plurality of clusters may have a common erroneous label in some embodiments, and the grouping of the content units may be based at least in part on similarity of content (e.g., semantic similarity, visual similarity etc.) of the content units relative to one another. Whether a given label assigned by the first version of the particular CM to a content unit is erroneous or not may be determined using a variety of techniques in different embodiments—e.g., in some embodiments input received via one or more programmatic interfaces from human reviewers may be used to decide whether a CM-assigned label is incorrect, while in other embodiments a jury of GAIMs or FMs may be used instead of or in addition to human reviewers.

The enhancement iteration may further include generating, using at least a respective content descriptor generated for individual ones of the clusters, one or more synthesized content units per cluster in some embodiments. One or more analyzers which may include one or more GAIMs may be used to generate the content descriptors in some embodiments, while a set of content generators (CGs) which may also include one or more GAIMs may be used to synthesize the content units in various embodiments. In some embodiments a content descriptor may comprise some number of text tokens, and may also be referred to as a content description. In other embodiments, a content descriptor may include both text and non-text portions—for example, simplified diagrams or figures which can help describe the common features of the cluster may be included in a content descriptor along with text.

The operations of grouping the erroneously labeled content units into clusters and generating corresponding descriptors may represent examples of analysis of the erroneously labeled content units in some embodiments which is performed to enhance the particular CM. In some embodiments, a pipeline or graph of multiple AI models (e.g., a diffusion model to generate visual portions of content units, an LLM to generate text portions, an image augmentation model to modify visual portions slightly, a text augmentation model to modify generated text slightly, another LLM to ensure that the synthesized content satisfies applicable standards or laws, and so on) may be used for content generation, and/or a pipeline or graph of multiple AI models may be used for the analysis. In various embodiments, with respect to a given content acceptability rule of a moderation policy which is being implemented, the set of CGs may synthesize one or more content units examples that comprise unacceptable content, and one or more content units that comprise acceptable content. In some embodiments, variants of initially generated content units may be included in the training input provided to the particular CM during a given enhancement iteration to make the particular CM more robust, such as content units whose text portion has been modified slightly by altering, adding or removing a few words, or content units whose image portion has been modified slightly by changing a few pixels. In at least one embodiment, to further increase the robustness of the particular CM, the training input provided to the particular CM during a given enhancement iteration may include numerous variations of prompts along with corresponding content units. For example, in some cases an instruction portion of a prompt may request the CM to generate a single label for a single unacceptable subject matter category (USMC), while in other cases an instruction portion of the prompt may request respective labels for multiple USMCs. The lengths of the prompts may be varied in some embodiments, the language used to indicate an applicable moderation policy in the prompt may be varied, and so on.

In at least some embodiments, the enhancement iteration may also include transforming the first version of the particular CM to a second version, e.g., by training the first version on the synthesized content units to which labels have been assigned. In various embodiments, a label for a given synthesized unit may be determined or assigned using a plurality of CMs. In some cases, for example, individual CMs of the plurality of CMs may vote on acceptability/unacceptability labels for the synthesized content units, and results of the voting may be used to choose the respective labels for the synthesized content units. In one embodiment, the plurality of CMs may include the first version of the particular CM which is being enhanced in the current enhancement iteration. Once the second version of the particular CM has been obtained, an additional set of labeled content units may be obtained from the second version, and the next enhancement iteration may be started by grouping erroneous labels identified among the labels of the additional set.

In various embodiments, one or more content generators (CGs) which are used to synthesize content units to be used to enhance the particular CM may themselves be iteratively enhanced. A given enhancement iteration of or to a CG may comprise, in one embodiment, transforming a first version of the CG to a second version by training the first version on a training set which includes one or more of: (a) a plurality of initially unlabeled content units to which labels have been assigned, in accordance with one or more content acceptability rules, using a plurality of CMs including a version of the particular CM and (b) respective content descriptors generated for individual content units of the plurality of content units. The CG may be provided the content descriptors and labels in training examples in some embodiments, with the actual content of the content units serving as ground truth for the purposes of training the CG. In a subsequent enhancement iteration of the CG, additional unlabeled content units may identified and labeled using the multiple CMs including an enhanced version of the particular CM and provided as input to the CG along with corresponding descriptors of the content units. Thus, in various embodiments, iteratively improved versions of the CG may be used to generate synthetic content for enhancing the particular CM, while iteratively improved versions of the particular CM may be used to generate labels which are used to enhance the CG. This interlinked process of enhancing CMs and CGs may be referred to as co-training of the models of the CMs and CGs in some embodiments. Note that at least in some embodiments, the enhancement iterations of the CMs may be asynchronous with, and performed independently of, the enhancement iterations of the CGs—for example, in a given time period, different numbers of enhancement iterations may be performed for a CM than for a CG, the starting/ending times of the iterations for the CMs may differ from the starting/ending times of the iterations for the CGs, and so on.

According to some embodiments, content acceptability rules and/or other elements of content moderation policies may be chosen or specified via programmatic interfaces by FM owners (or other users of cloud based FM services or moderation services) on whose behalf content moderation is to be performed. A given acceptability rule may, for example, indicate one or more unacceptable subject matter categories (USMCs), such as content pertaining to, describing or depicting one or more of: (a) violence, (b) hate, (c) insults, (d) misconduct or (e) prompt attacks directed to one or more FMs or GAIMs. In at least some embodiments, corresponding to individual USMC, the moderation policy or an individual rule may indicate a filtering strength setting to be used to generate labels identifying content units as unacceptable. For example, filtering strength options such as "high", "medium" or "low" may be specified by an FM owner or other authorized user of a CM to indicate how careful or strict the CM should be when labeling and blocking content based on a particular USMC or a group of USMCs. The filtering strength settings may be used in some embodiments to determine confidence level thresholds, and the CM may ensure or verify that the actual confidence level associated with a proposed label satisfies the appropriate confidence level threshold before designating that the proposed label is the final label for a content unit. Note that in some embodiments, labeling a given content unit may comprise generating respective sub-labels for various USMCs which are specified in the rules of an applicable content moderation policy; as such, a label for a content unit as a whole may actually comprise multiple sub-labels. In various embodiments, a moderation result produced by a CM for a given content unit of a moderation task may comprise generating a label (which may be a multi-part label), followed by taking zero or more response actions (such as blocking/preventing the content unit from reaching an FM, blocking/preventing the content unit from reaching an end user of an FM, generating an alert or report indicating an unacceptable content unit, etc.)

According to some embodiments, a system for dynamically modifying content moderators at run-time (e.g., at the time that a moderation task indicating a content unit which is to be moderated is received) may include one or more computing devices. The computing devices may include instructions that upon execution on or across the one or more computing devices train or generate, corresponding to a plurality of groups of content units, a respective set of run-time adapters (RTAs) for a CM which includes a GAIM. In some embodiments, the CM which is to be modified at run-time may comprise a production CM assigned to moderate content sent to or by an FM hosted at a cloud computing environment, such as one of the versions of a CM for which iterative enhancement iterations are conducted as described above. The RTAs may correspond to, or be associated with, individual task categories of a plurality of task categories with which the groups of content units are associated in at least some embodiments. Different acceptability rules may apply to respective groups of the content units in at least some embodiments. The RTAs may be prepared without modifying baseline weights of the GAIM which were learned during one or more training stages of the GAIM that were conducted prior to initiation of preparation of the RTAs in some embodiments. In one embodiment, individual ones of the RTAs may indicate respective sets of modifications to be applied to (e.g., numerical quantities to be added to, subtracted from, multiplied with, or divided by) one or more weights of the GAIM at run-time to enforce, or improve the enforcement of, content acceptability rules or policies of the kind introduced above. In some implementations, an RTA may comprise a vector or matrix of adaptation weights, with at least one dimension of the vector or matrix being smaller than a corresponding dimension of a matrix which is used to store baseline weights of the GAIM.

From the set of generated or learned RTAs, a subset of RTAs may be chosen at run-time to dynamically modify one or more weights of a CM's GAIM for processing/analyzing a given input content unit which is to be moderated. Using the GAIM and the dynamically chosen subset of the RTAs, in various embodiments a label may this be generated for a content unit of a particular moderation task directed to or obtained by the CM in at least some embodiments. The subset of RTAs (which may include a single RTA or multiple RTAs) may be selected after the particular moderation task or content unit is received or obtained at the CM in various embodiments. The label may indicate acceptability or unacceptability of the content unit in accordance with a content acceptability rule and/or a filtering strength or filtering criteria associated with the content acceptability rule. In some embodiments, the subset of RTAs may be selected based at least in part on classifying the input content unit or the moderation task, e.g., to determine how similar the moderation task is to individual ones of the tasks for which the groups of content units were identified and used to generate the RTAs. In various embodiments, the subset of RTAs may be selected based at least in part on attributes of the content unit which is to be moderated. In one embodiment, an administrator of an FM or some other user may use one or more programmatic interfaces to specify a hint which can be used to dynamically select the subset of RTAs.

In at least one embodiment, e.g., prior to blocking or accepting the content of the particular moderation task, a CM may verify that a confidence level associated with the label exceeds a particular confidence threshold. The confidence level may be computed based at least in part on a context-dependent probability of occurrence of one or more tokens produced by the GAIM in response to a prompt for the particular moderation task in some embodiments. For example, the respective logit based probabilities associated with a set of tokens indicating unacceptability (e.g., the token "yes" in a portion of CM output such as "<violence>yes<\violence>", or the token "1" in "<violence>1<\violence>") and acceptability (e.g., the token "no" in a portion of CM output such as "<violence>no<\violence>" or the token "0" in "<violence>0<\violence>"), given the context (including the particular prompt that was used, the particular content unit being moderated, etc.) in which the tokens where generated, may be normalized to compute or estimate the confidence level in one implementation, as described below in further detail. In at least some embodiments, the particular confidence threshold to use may also be identified dynamically, e.g., after the moderation task is obtained, based on classification of the moderation task and/or based on filtering strength settings or filtering criteria associated with the content acceptability rule or policy being applied by the CM. Corresponding to a given filtering strength setting (e.g., "high", "medium" or "low"), respective target values of one more metrics of inference quality (such as false positive rates with regard to detection of unacceptable content, recall or true positive rate, etc.) of the CM may be identified in various embodiments. Confidence thresholds to be used for labels may be chosen based at least in part on the respective target values in one embodiment, e.g., by plotting an ROC (receiver operating characteristic) curve using one or more validation data sets and selecting the particular threshold whose corresponding point on the ROC curve is closest (in Euclidean distance) to the target values.

FIG. 1 illustrates an example system environment in which content moderators for foundation models may be iteratively enhanced using synthesized content, according to at least some embodiments. As shown, system 100 may include resources and artifacts of a foundation model service (FMS) 102 which enables users or clients to utilize (e.g., send inference requests to, and receive corresponding inference results from) various models of foundation model collection 176. Moderation subsystem 145 may be used to enforce moderation policies with regard to unacceptable/unsafe content in prompts directed to models of foundation model collection 176, as well as content in output inference responses sent by the models of foundation model collection 176 in the depicted embodiment. The prompts may be transmitted to the foundation models from a variety of client devices 164 in some embodiments, such as desktops, laptops, mobile devices such as phones, and the like via programmatic interfaces 177 (e.g., application programming interfaces (APIs), graphical user interfaces, web-based consoles and interfaces, command-line tools and the like). At least some inference responses generated by FMs to the prompts may be sent to client devices 164 via the programmatic interfaces 177.

Foundation model collection 176 may comprise numerous generative artificial intelligence models (GAIMs) 179 in some embodiments, such as one or more large language models (LLMs) including LLMs 155A and 155B, multimodal GAIMs 157A and 157B, and so on. The models of collection 176 may have a very large number (e.g., tens or hundreds of billions) of learned parameters, and be pre-trained using very large corpora of text and or multimodal input, such that the models are capable of fairly sophisticated general reasoning about language and other modes of data. Such large models may be used as foundations for a variety of applications (hence the use of the term "foundation model"). At least some of the FMs may be pre-trained, fine-tuned and executed for inference using FM training and execution (FTE) resources 144 in the depicted embodiment. At least some input data examples for the pre-training and/or fine-tuning of the FMs may be obtained from external data sources 133 in various embodiments. In some embodiments, the FMS may invoke or utilize a set of external APIs 150 to perform inference tasks in response to prompts. In at least one embodiment, FMS 102 may be implemented at least in part using resources of a cloud computing environment. In some embodiments, at least a subset of FMs of the foundation model collection 176 may be hosted at the FMS on behalf of FM development or fine-tuning organizations, entities or individuals. Such organizations, entities or individuals may be referred to as FM owners. In at least one embodiment, an entity such as a cloud provider network at which the FMS is implemented may itself pre-train and/or fine-tune one or more FMs of collection 176.

Moderation subsystem 145, which may also be referred to as a moderation service in some embodiments, may comprise content moderators 146, content generators 147, analyzers 148, moderation metadata 166, iterative enhancement workflow coordinators 149, run-time adapter (RTA) collection 167, RTA creation coordinators 152, and moderation related training and execution (MTE) resources 154. Individual ones of the components of moderation subsystem 145 that are shown in FIG. 1 may comprise or use software and/or hardware of one or more computing devices in various embodiments.

A given content moderator 146 may comprise one or more AI models including a GAIM in at least some embodiments. CMs 146 may act as intermediaries between end users of FMs, and the FMs of foundation model collection 176 in at least some embodiments, enforcing moderation policies which indicate or comprise content acceptability rules chosen or defined by FM owners or associated administrators. The acceptability rules or moderation policies may be applied to input sent to the FMs (e.g., prompts sent by end users via programmatic interfaces 177) in some embodiments. In at least one embodiment, the rules or policies may be applied to output generated by the FMs (e.g., inference results) in response to the prompts. In other embodiments, the rules/policies may be applied to content flowing in both directions (to prompts sent to the FMs, as well as responses received from the FMs) between FMS and FM users. In one embodiment, at least some content acceptability rules and/or policies to be used with regard to interactions of a given FM with end users may be specified via programmatic interfaces 177 by FM owners or administrators. In some embodiments, the FM owners/administrators may also indicate, via programmatic interfaces, whether prompts sent to the FMs are to be moderated in accordance with the policies/rules, whether output generated by the FMs is to be moderated, or whether content flowing in both directions is to be moderated. Moderation policies indicating or comprising content acceptability rules may be stored as part of moderation metadata 166 in at least some embodiments.

According to at least some embodiments, multiple iterative enhancement iterations may be performed for individual ones of the CMs 146 that are assigned to moderate content directed to or from FMs of collection 176. A given CM enhancement iteration may comprise a set of operations performed by content generators (CGs) 147, analyzers 148 as well as multiple CMs 146 in at least some embodiments, as discussed below in further detail. In at least one embodiment, enhancement iterations for CGs 147 may also be performed, e.g., asynchronously with respect to the enhancement iterations of the CMs. Iterative enhancement workflow coordinators 149 may orchestrate the operations of the enhancement iterations of the CMs and the CGs in at least some embodiments.

In one embodiment, for example, an enhancement iteration for a particular CM may include identifying examples of erroneous moderation labels (e.g., labels indicating that a content unit is unacceptable according to a particular policy, when in fact the content unit is actually deemed acceptable by human reviewers and/or a jury of GAIMs) generated by a given version of the particular CM. The identified erroneously-labeled content units may be grouped into clusters in some embodiments, where a given cluster's content units have been assigned the same label, and where content units are selected for inclusion in a given cluster based at least in part on similarity of content. For individual clusters, a respective content descriptor (e.g., text summarizing the common features of the content units of the cluster) may be generated by one or more analyzers 148 (with individual analyzers comprising one or more AI models such as, but not limited to, GAIMs) in the depicted embodiment. In some embodiments, the clustering may also be performed by one or more analyzers 148.

The content descriptors for one or more clusters may be provided as input to one or more CGs 147 in the depicted embodiment, to obtain synthesized content units that are generated in accordance with or based on the descriptors. A given CG may comprise one or more AI models (including GAIMs in some cases) in some embodiments, such as a diffusion model, an LLM or the like. The synthesized content units may then be assigned moderation labels (e.g., acceptable/unacceptable labels) based on analysis by a plurality of CMs in some embodiments—for example, a voting based algorithm may be used to decide the final label based on respective proposed labels generated for a given synthesized content unit. The labeled synthesized content units may then be used to train an enhanced version of the particular CM (e.g., using MTE resources 154) for which the iteration was performed in various embodiments. The new version of that CM obtained via such training may be executed (e.g., using MTE resources 154) to generate labels for additional content units, from which examples of erroneous labeling (if any such erroneous labels are detected) may be identified to start the next iteration of enhancement of the CM in the depicted embodiment.

According to at least one embodiment, a plurality of categories of content moderation tasks that are to be performed by a CM assigned to a particular FM's input and/or output may be identified. The task categories may differ from one another based, for example, on the set of acceptability rules that are to be applied, whether the rules are to be applied to content units that are provided by humans or content that is generated by GAIMs (e.g., prompts that may be generated by GAIMs other than the FM whose content is being moderated), and/or based on other properties. Corresponding to individual ones of the task categories, one or more real-time adapters (RTAs) may be created in various embodiments using content unit examples representing the task categories, and stored in RTA collection 167. A given RTA may in some embodiments comprise numerical quantities, arranged in a vector or matrix (sometimes referred to as a low-rank vector or a low-rank matrix), that can be used to modify baseline weights of a GAIM of a CM at run-time without modifying the saved baseline weights themselves. The baseline weights, which may be learned in one or more phases of training or fine-tuning of the GAIM of the CM, may not themselves be modified during preparation of the RTAs in various embodiments. In at least one embodiment, preparation of the RTAs may comprise a constrained training procedure of the GAIM, orchestrated by an RTA creation coordinator 152, in which numerical elements of the vector or matrix are learned in response to providing example content units of the different moderation task categories as input to the GAIM while keeping the baseline weights frozen or fixed.

After the RTAs are created and stored, subsets of the RTAs may be chosen dynamically at run-time to adapt a CM to improve the quality of the CM's inference response with respect to a given moderation task in the depicted embodiment. For example, the moderation task which is received or obtained at the CM may be classified to find the closest set of moderation task categories for which respective RTAs were created earlier, and then a combination of RTAs corresponding to that closest set may be selected to adapt the CM for that particular moderation task. In at least some embodiments, when generating a label, a CM may verify that a confidence level associated with that label satisfies a threshold criterion. The confidence level itself may be computed in a data manner in some embodiments, e.g., based at least in part on context-dependent probability of occurrence of one or more tokens in the output generated by the CM for the moderation task as described below in further detail. The threshold criterion may be chosen in some embodiments based at least in part on filtering strength settings or filtering criteria associated with the applied acceptability rules or policies.

Figure 2:
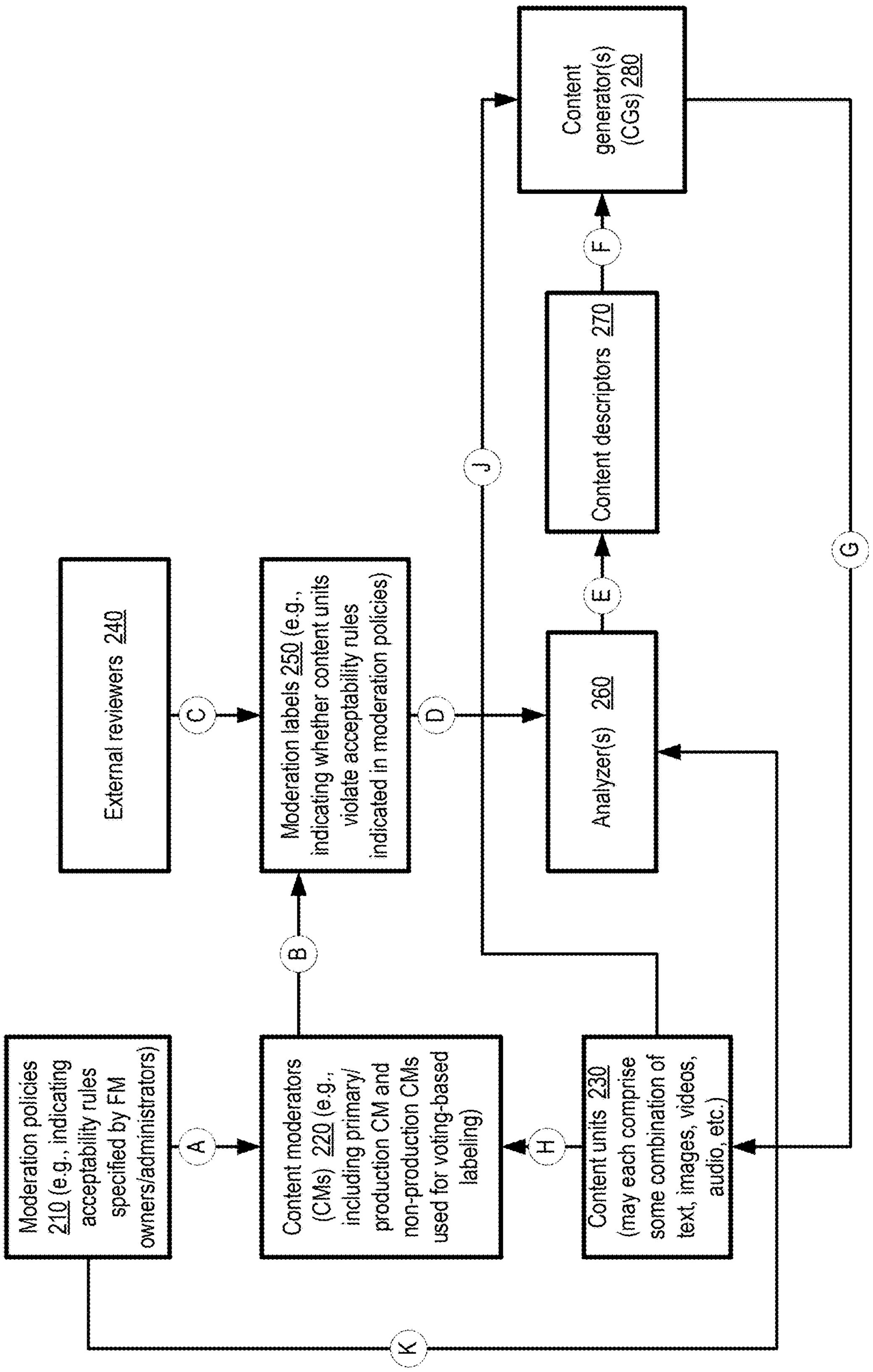
FIG. 2 illustrates a high level overview of workflows for iterative enhancement of content moderators and content generators, according to at least some embodiments.

FIG. 2 illustrates a high level overview of workflows for iterative enhancement of content moderators and content generators, according to at least some embodiments. In the depicted embodiment, a set of moderation policies 210 may indicate content acceptability rules specified by FM owners/administrators for content units directed to or from one or more FMs. CMs 220 may comprise a primary or production CM (PCM) which is enhanced iteratively, as well as one or more other CMs that participate in the iterative enhancement workflows of both the primary CM and one or more content generators 280.

The PCM may comprise one or more GAIMs or other AI models in the depicted embodiment, which are initially trained and/or fine-tuned to implement a moderation policy 210 by generating respective moderation labels for content units which may be directed to or produced as output by an FM. After initial training or fine-tuning of the PCM is completed and the PCM has been deployed for production use, a series of enhancement iterations of the PCM may be orchestrated by a workflow coordinator of the moderation subsystem in various embodiments. In a particular enhancement iteration of the PCM, a set of moderation labels 250 that have been generated in accordance with a particular moderation policy 210 (as indicated by the arrow labeled A) by a particular version of the PCM (as indicated by arrow B) for respective content units may be reviewed to identify erroneously labeled content units in various embodiments. A given content unit's label may be designated (e.g., by human external reviewers 240 and/or by a jury of GAIM-based external reviewers such as LLMs) as erroneous if, from the perspective of the reviewer or group of reviewers as a group, the PCM has labeled the content unit as unacceptable when the content unit should actually have been labeled as acceptable based on the applicable moderation policy, or vice versa (if the PCM has labeled the content unit as acceptable when the content unit should actually have been labeled as unacceptable based on the applicable moderation policy) in various embodiments. In some embodiments, one or more analyzers 260 (which may also include GAIMs or other AI models) may participate in the review of the generated labels in view of the applicable moderation policy (the moderation policy may be accessible to the analyzers as indicated by arrow K).

Assuming that some number of erroneous labels are identified, the corresponding content units may be grouped into clusters in at least some embodiments. A given cluster may have the following properties in one embodiment: (a) individual members of the cluster may have been assigned the same (incorrect) moderation label and (b) members may have been included in the cluster based on the similarity of their content. In some embodiments, analyzers 260 may be used to group the content units into clusters. In other embodiments, other tools may be used for clustering. In scenarios in which individual ones of the content units comprise both text and images, for example, text similarity and image similarity may first be determined, and then an overall similarity score may be generated from the text and image similarity scores. Image similarity may be determined using convolutional neural networks (CNNs) in some embodiments, and/or using other deep learning AI models that generate embeddings for respective images, with the embeddings being compared using metrics such as cosine similarity. Algorithms in which image pixel values and/or color histograms are compared may be used in some embodiments. In one embodiment, algorithms such as Word2Vec or word overlap analysis may be used to determine text similarity scores.

In various embodiments, corresponding to individual ones of the clusters of erroneously labeled content units (as indicated by arrow D), analyzers 260 may generate respective content descriptors 270 (as indicated by arrow E). A given content descriptor may, for example, comprise text that indicates common features of the content units of the cluster. In at least some embodiments, two types of content descriptors may be generated corresponding to a given cluster by the analyzers: one descriptor for content that should be labeled unacceptable in accordance with the applicable moderation policy, and another for content that should be labeled acceptable in accordance with the applicable moderation policy. At least some of the clusters may comprise content units which are close to the boundary between acceptability and unacceptability (which may be why they were labeled erroneously to begin with) in the depicted embodiment.

The content descriptors 270 may be provided as input to one or more content generators (CGs) 280, which may generate synthesized content units 230 (as indicated by arrow G) based on the descriptors in the depicted embodiment. In some embodiments, multiple synthesized content units may be generated by the CGs for a given content descriptor (e.g., by creating variants that differ slightly from an initial synthesized content unit or comprise augmented versions of an initial synthesized content unit). A given synthesized content unit may comprise any combination of text, images, videos, audio in some embodiments, with the particular combination of content modes that is to be included in individual synthesized content units being a parameter of the workflow, selected for example by the workflow coordinator.

Corresponding to individual synthesized content units, respective moderation labels may be identified based on input from a plurality of CMs (which may include the PCM in some embodiments, and may exclude the PCM in other embodiments). In one embodiment, for example, respective votes may be cast by individual CMs regarding acceptability or unacceptability of a given synthesized content unit in view of an applicable moderation policy, and the final label may be chosen based on the majority of votes. The labeled synthesized content units may then be used to further train or fine-tune the current version of the PCM (as indicated by arrow H) to obtain a new version corresponding to the enhancement iteration. Labels generated by the new version of the PCM for various content units may be analyzed to identify erroneous labels that can be used in the next iteration of enhancement of the PCM in various embodiments. In some embodiments, the enhancement iterations of the PVM may continue indefinitely.

In at least one embodiment, content units obtained or selected from one or more external data sources or databases (such as data sources 133 shown in FIG. 1) may also be used for training new versions of CMs in some enhancement iterations, e.g., in addition to or instead of using content units synthesized by content generators 280. In some embodiments, one or more content descriptors 270 generated by analyzers 260 may be used to select or obtain content units from external data sources or databases which can be used to train new versions of CMs in one or more enhancement iterations. For example, search queries or filters comprising content descriptors 270 (or portions of content descriptors 270) may be generated by an iterative workflow enhancement coordinator. The queries may be submitted to an external data source which stores a corpus of content units, and the content units provided in response to the search queries may be added to the training data provided as input to a CM during a particular enhancement iteration.

In at least some embodiments, the CGs 280 may also be iteratively enhanced. In one embodiment, in a given CG enhancement iteration, a set of unlabeled content units may be identified and labeled based on analysis by multiple CMs including the current version of the PCM. Content descriptors 270 for these content units may be generated by analyzers 260. The content descriptors 270 may be used, along with the content units and labels generated by the multiple CMs (as indicated by arrows F and J), as training input or fine-tuning input for the current version of a CG. A new version of the CG generated via such training may then be deployed to synthesize content units for the next CM enhancement iteration. In some embodiments, the PCM and the CGs may both be enhanced iteratively via interlinked workflows. Enhancement iterations of CGs may be initiated and/or performed asynchronously with respect to enhancement iterations of the PCM in at least some embodiments. In at least one embodiment, an enhancement iteration of the PCM may overlap at least partly in time with an enhancement iteration of a CG. In various embodiments, multiple versions of individual CGs and/or the PCM may be maintained at a moderation subsystem or service, enabling enhancement iterations to be performed without disrupting production usage of the PCM for moderating content directed to/from an FM.

Figure 3:
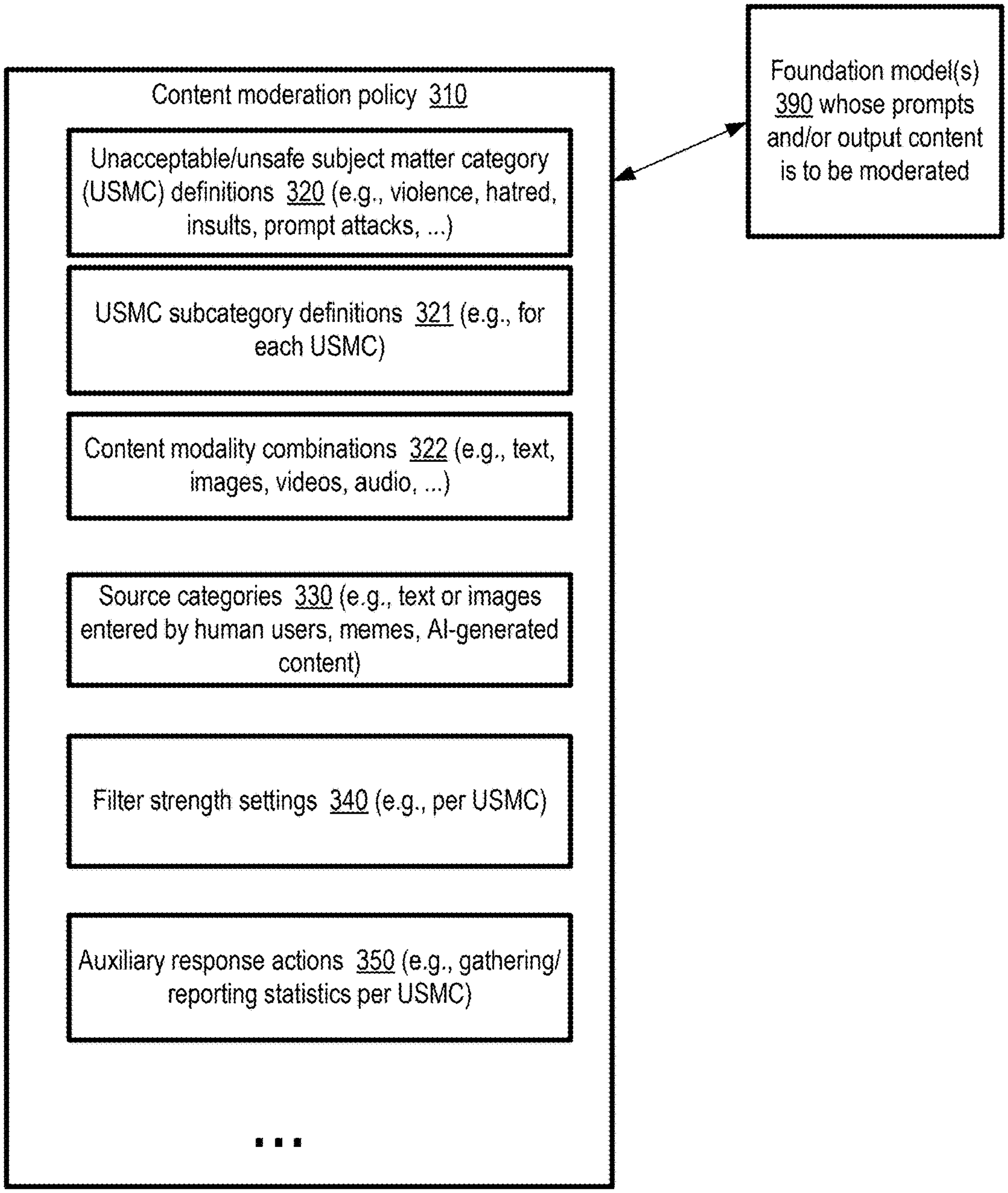
FIG. 3 illustrates example elements of a content moderation policy which may be set up for input and/or output of a foundation model, according to at least some embodiments.

FIG. 3 illustrates example elements of a content moderation policy which may be set up for input and/or output of a foundation model, according to at least some embodiments. Content moderation policy may be defined or specified by an FM owner for one or more FMs such as foundation model(s) 390 in the depicted embodiment, e.g., by providing input via one or more programmatic interfaces of an FMS similar in features and functionality to FMS 102 of FIG. 1. Metadata stored at the FMS may indicate the moderation policy which is applicable to any given FM hosted at the FMS in various embodiments. In at least one embodiment, a content moderation policy may be dynamically modified by an FM owner, and the CM assigned to the corresponding FM may have to dynamically adapt to the changes.

In various embodiments, a content moderation policy 310 may indicate or include one or more unacceptable or unsafe subject matter category (USMC) definitions 320, such as definitions of content which depicts or described gratuitous violence, insults, hatred, prompt attacks and the like. In addition to the high-level USMC definitions, USMC subcategory definitions 321 may be included in a content moderation policy 310 in some embodiments, providing finer-grain explanations of subject matter which corresponds to a given USMC. Note that various FM owners may define a given USMC (or a subcategory) using at least slightly different language in some embodiments, so a CM of an FMS may be trained or fine-tuned using numerous variants of USMC definitions and/or corresponding subcategory definitions.

Content modality combinations 322 to which the policy is to be applied may be included in the policy in some embodiments. For example, one FM owner may wish to have video and audio moderated along with text and images, while another FM owner (whose FM is not used for video or audio prompts or output) may wish to moderate only text and images.

In at least one embodiment, one or more source categories 330 whose content is to be moderated may be specified as part of a content moderation policy. Such source categories may include, for example text or images entered into prompts by human users, memes, AI-generated content, and the like.

In some embodiments, an FM owner may specify filtering criteria such as filter strength settings 340 (e.g., per USMC or per subcategory), indicating for example how important it is for the FM owner that truly unacceptable content units be identified and blocked even if the CM mistakenly identifies some content units as unacceptable. In one embodiment, user-friendly filtering strength levels such as “high”, “medium” or “low” may be defined by an FMS, and corresponding values for metrics such as false positive rates or true positive rates may be chosen at the FMS. In other embodiments, FM owners may directly specify targeted accuracy metrics such as false positive rates, recall, and the like for the CM.

In various embodiments, a default action taken in response to labeling a content unit as unacceptable may comprise blocking or deleting the content unit so that it is not delivered to its originally intended destination (e.g., to the FM if the content unit is a prompt submitted by a user, and to an FM user if the content unit is output generated by the FM). In some embodiments, an FM owner may specify one or more auxiliary response actions 350 to be taken if and when a content unit is labeled unacceptable. Such auxiliary response actions may, for example, comprise gathering and/or reporting statistics per USMC, blocking an FM user’s access to an FM if the number of unacceptable prompts from the FM user exceeds a threshold, replacing a currently deployed version of an FM by an alternate version if the number of unacceptable responses from the deployed version exceeds a threshold, etc.

In various embodiments, some or all of the elements of content moderation policy 310 shown in FIG. 3 may collectively represent the content acceptability rules that are to be enforced by a CM. Thus, in one embodiment a given content acceptability rule may indicate the type of subject matter which is considered unacceptable, the modality of the content which is to be analyzed for acceptability, the sources whose content is to be analyzed, the filter strength settings to be applied to declare a particular content unit as unacceptable, and/or whether any additional auxiliary actions apart from blocking unacceptable content are to be undertaken. Note that not all the policy elements shown may be required in some embodiments. For example, in one embodiment, a content moderation policy may only specify one or more USMCs, in which case the content acceptability rules may require any content units which have subject matter of the USMCs be labeled as unacceptable and blocked, regardless of modality, source category, or filter strength settings. In at least some embodiments, a content moderation policy may be required to specify at least one USMC, while all the other policy elements shown in FIG. 3 may be optional.

Figure 4:
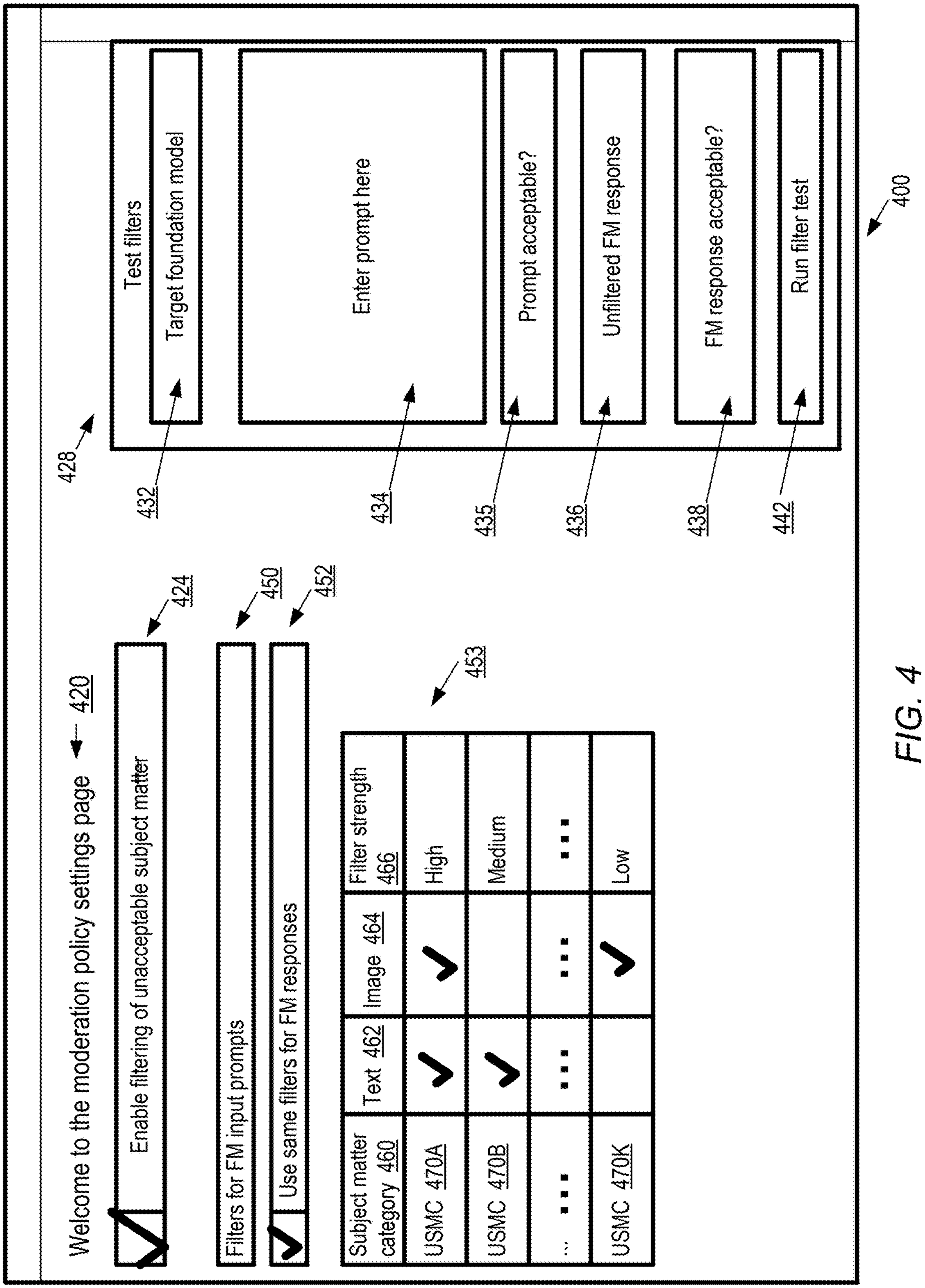
FIG. 4 illustrates an example web-based interface which may be used to specify and test content moderation settings of foundation models, according to at least some embodiments.

FIG. 4 illustrates an example web-based interface which may be used to specify and test content moderation settings of foundation models, according to at least some embodiments. As shown, web-based interface 400 (e.g., a web page reached via a URL (Uniform Resource Locator) of an FMS similar in functionality to FMS 102 of FIG. 1) may comprise a welcome message 420 indicating that a page for specifying moderation policy settings has been reached by a user (e.g., an FM owner) in the depicted embodiment.

Interface element 424 may enable the user to specify (e.g., by using a check mark as shown) whether filtering of unacceptable subject matter is to be performed or not. Element 450 may indicate that filters or acceptability rules are going to be applied to FM input prompts as a default; element 452 may be used to indicate whether acceptability rules are going to also be applied to responses generated by the FM for which the moderation policy is to be applied. The check mark in element 452 indicates that a user has decided to apply the same filters for both prompts and FM responses in the depicted example scenario.

Region 453 of web-based interface 400 may be utilized to specify a list of unacceptable subject matter categories 460 and the content modes for which filtering is to be performed for individual ones of the categories. Text explanations or definitions of the categories (such as USMC 470A, USMC 470B, or USMC 470K) may be provided by the FM owner via a different interface than web-based interface 400 in the depicted scenario. In at least one embodiment, the FMS may provide default definitions for various USMCs and/or sub-categories, and the FM owner may modify the definitions if desired.

In the example scenario shown in FIG. 4, the FM owner may choose whether the acceptability rules for various selected USMCs are to be applied to text portions (in the column labeled text 462) of content units, image portions (in the column labeled image 464), or both text and image portions. A filter strength 466 (for which one of "High" Medium" or "Low" may be chosen) may be indicated for each USMC and content mode combination selected. For example, with regard to USMC 470A, the FM owner has indicated that both text and image content is to be filtered, with filter strength set to "High". With regard to USMC 470B, the FM owner has indicated that only text content is to be filtered, with filter strength set to "Medium", while with regard to USMC 470K, the FM owner has indicated that only image content is to be filtered, with filter strength set to "Low".

In addition to specifying various aspects of a content moderation policy such as the USMCs, content modes and filter strengths, web interface 400 may also be used to test out the selected moderation policy in the depicted embodiment. Region 428 of the interface 400, labeled test filters, may enable the FM owner to specify a particular version of a target foundation model 432 for which moderation policy based filtering is to be tested. In region 434, the FM owner may enter a prompt (which may be multimodal, and may for example comprise an image which is dragged and dropped to region 434 as well as text entered into region 434) directed to the target foundation model.

The FM owner may use interface element 442 (e.g., by clicking a mouse with the cursor within element 442) to initiate a test of the policy for a prompt which has been entered. In response to receiving the indication that the test is to be begun, a CM may be provided the policy details and the input prompt in the depicted embodiment. The CM may apply the acceptability rules of the policy and assign a label to the prompt, indicating whether the prompt has been deemed acceptable or unacceptable. An indication of the label assigned to the prompt may be provided in region 435 of the interface.

If the prompt was found acceptable, it may be sent to the target foundation model 432, and an initial version of the response (which has not yet been analyzed by the CM) may be presented in region 436 of the interface. An indication of an acceptable/unacceptable label assigned to the FM response by the CM may be presented in region 438 of the interface. In some embodiments, only a portion of the FM response may be blocked as unacceptable, and the remainder of the FM response may be presented via the interface 400. In various embodiments, other types of interfaces and/or interface layouts may be used to enable authorized FMS users such as FM owners to specify various aspects of moderation policies and/or to test the policies out than the interface and layout shown in FIG. 4.

Figure 5:
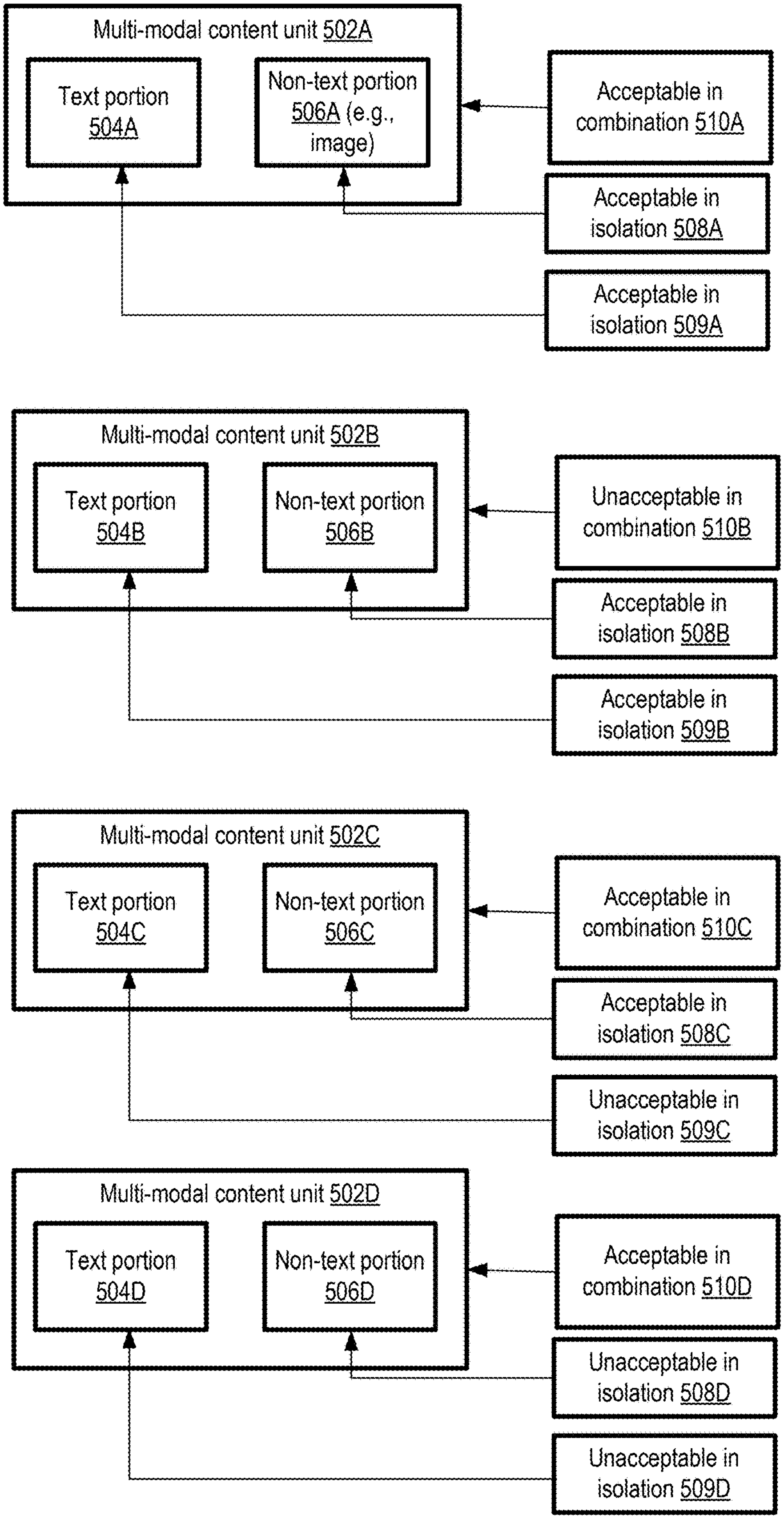
FIG. 5 illustrates example scenarios in which the overall acceptability of a multi-modal content unit directed to or produced by a foundation model may in some cases differ from the acceptability of different subsets of the content unit, according to at least some embodiments.

In some cases, the complexity of content moderation may increase as the number of modes of content combined within a given content unit which is to be moderated increases. This may sometimes occur, for example, because of cross-modal interactions, such as changes to the semantics or interpretation of text based on an accompanying image. FIG. 5 illustrates example scenarios in which the overall acceptability of a multi-modal content unit directed to or produced by a foundation model may in some cases differ from the acceptability of different subsets of the content unit, according to at least some embodiments. Four examples of multi-modal content units are shown, each comprising a text portion and a non-text portion such as an image. Multi-modal content unit 502A may comprise text portion 504A and non-text portion 506A. If each of the portions is analyzed independently of the other in light of a specified content moderation policy or set of acceptability rules, text portion 504A may be found acceptable in isolation 509A, and non-text portion 506A may also be found acceptable in isolation 508A. Content unit 502A as a whole may also be found acceptable in combination 510A.

In some cases, even if individual content portions of a content unit are acceptable by themselves, the content unit as a whole may end up being unacceptable due to the impact of each of the content portions on the interpretation of the other portion. This is illustrated in the case of multi-modal content unit 502B. Here, text portion 504B is acceptable in isolated 509B, and non-text portion 506B is acceptable in isolation 508B. However, when the text portion and the non-text portion are examined together, the meaning of the text portion may change because of the content of the non-text portion (or vice versa), rendering the two unacceptable in combination 510B. Such impacts of different portions of a given content unit on one another may also be influenced by cultural norms, which may differ from country to country or region to region in some embodiments. For example, it may be the case that text portion 504B is acceptable in isolation in a cultural context of country A, and that non-txt portion 506B is also acceptable in isolation in the cultural context of country A, but the content unit 502B as a whole may be unacceptable on a different cultural context of a country B.

Acceptability of one mode of content within a content unit may lead to unacceptability of the entire content unit in some example scenarios. This is the case for multi-modal content unit 502C, in which text portion 504C is unacceptable in isolation 509C, while non-text portion 506C is acceptable in isolation 508C. Here, the presence of the non-text portion may change the acceptability of the text portion, thereby rendering the overall content unit 502C acceptable in combination 510C.

In a few cases, even if the portions of a content unit are all unacceptable in isolation, they may influence the interpretation of each other in such a way that the overall content unit becomes acceptable. Multi-modal content unit 502D may be found acceptable in combination 510D, even though its constituent text portion 504D is unacceptable in isolation 509D, and non-text portion 506D is also unacceptable in isolation 508D.

In various embodiments, a CM model may have to be trained or fine-tuned with numerous examples of such cross-modal interactions so that the model does not rely entirely on interpretation of individual portions of content of a given content unit. A diverse collection of content units that is carefully labeled may have to be identified or synthesized created for such CMs to be able to interpret the combination of different modes of content correctly. Note that while FIG. 5 shows example content units that all include text as one of the modalities, the concepts of inter-modality influence and the increased complexity of moderating multi-modal content may generally apply to any type of multi-modal content in various embodiments, including content units that do not include text (but do include more than one non-text modality such as image, video, audio and the like).

Figure 6:
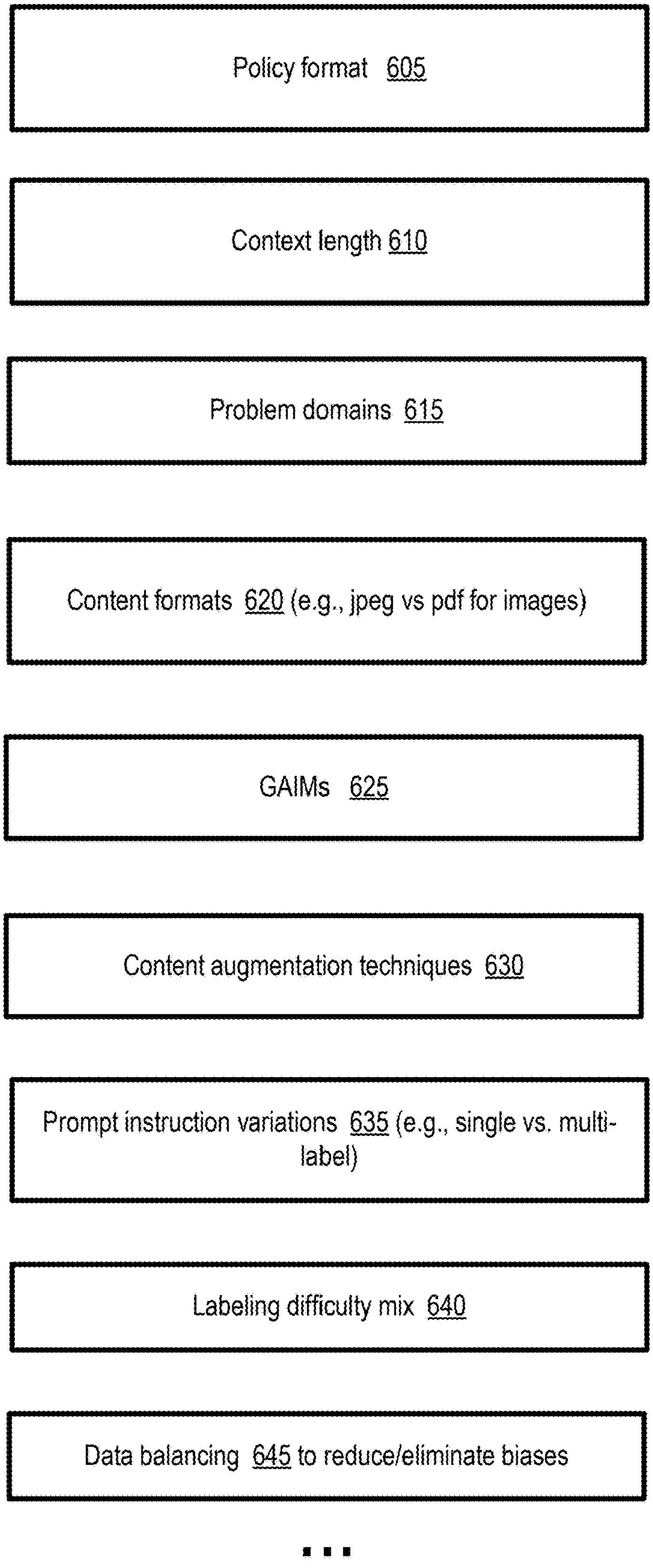
FIG. 6 illustrates example factors which may be taken into account when generating data for training and/or fine-tuning robust and generalized artificial intelligence (AI) models used for content moderation workflows, according to at least some embodiments.

FIG. 6 illustrates example factors which may be taken into account when generating data for training and/or fine-tuning robust and generalized artificial intelligence (AI) models used for content moderation workflows, according to at least some embodiments. The factors illustrated in FIG. 6 may be used to assemble pre-training data sets for the GAIMs of a production CM in various embodiments, and/or to synthesize new content units during iterative enhancement iterations of the CM.

A wide variety of policy formats 605 may be included in the training or fine-tuning data, using different variations of language to define and describe unacceptable subject matter. In some cases, for example, very short definitions of unacceptable subject matter categories and/or subcategories, or even just the names of the categories, may be used to indicate the USMCs; in other cases, fairly long descriptions, explanations or examples may be used to indicate USMCs. By varying the manner in which the policies are formatted or expressed, CMs may be made more capable of interpreting and applying a wide variety of policies in at least some embodiments, thereby making the CMS policy-agnostic instead of being tied to a single policy or a single format for expressing policies.

In at least some embodiments, the context length 610 (e.g., the number of text tokens included, the size of non-text content included, etc.) may be varied in the different content units that are used to train or fine-tune a CM, e.g., during the iterative enhancement iterations described earlier. In at least some embodiments, the instruction portions or system portions of prompts supplied to the CMs along with the content units may also be varied to make the CMs more robust to both prompt variants and content unit length. In some embodiments, a plurality of problem domains 615 may be identified, and the set of content units used to train a CM may be generated such that the problem domains are represented within it. A number of different content formats 620 may be utilized for different content modes represented in the content units, such as jpg versus pdf formats for images.

A number of GAIMs may be available for implementing CMs, CGs and/or analyzers of enhancement workflows in some embodiments. In some embodiments, multiple GAIMS 625 created and/or fine-tuned by different organizations may be used in combination to perform the operations of CMs, CGs and/or analyzers, so that the moderation subsystem is not tied to or limited by any one GAIM architecture or design.

In some embodiments, one or more content augmentation techniques 630 may be used to add diversity to the content items used for training and/or fine-tuning CMs. Such techniques may be applied to various modes of content included in the content units in some embodiments—e.g., text portions of content units may be augmented/modified by substituting synonymous words or phrases, image portions may be modified by rotating or changing colors of images, modifying a subset of pixels and the like. The language used in the instruction portions of the prompts may also be varied in some embodiments.

Several prompt instruction variations 635 may be used in one embodiment. For example, some prompts may instruct a CM to generate a label for a single USMC at a time, so that N different results may have to be generated to perform moderation when N different USMCs are specified in the applicable policy. In some embodiments, prompts directed to the CM may instruct the CM to provide separate labels for each USMC, as well as an overall label based on those per-USMC labels.

When assembling a set of content units which are to be used to pre-train or fine-tune a CM, in some embodiments labeling difficulty mix 640 may be used to select content units such that some fraction are relatively easy to label while others are more difficult to label. The difficulty of labeling a given content unit may be estimated, for example, based on feedback from human reviewers, the degree of disagreement among numerous CMs, and so on.

In some cases GAIMs may exhibit biases or prejudices, typically as a result of a lack of diversity among the training input examples. In at least some embodiments, data balancing 645 based on distributions of entities with different demographics may be used to try to reduce or eliminate biases of the GAIM used for CMs or CGs. Other factors than those shown in FIG. 6 may be used in some embodiments to make the CMs of an FMS more accurate and robust with respect to the kinds of content units for which labels can be correctly assigned.

Figure 7:
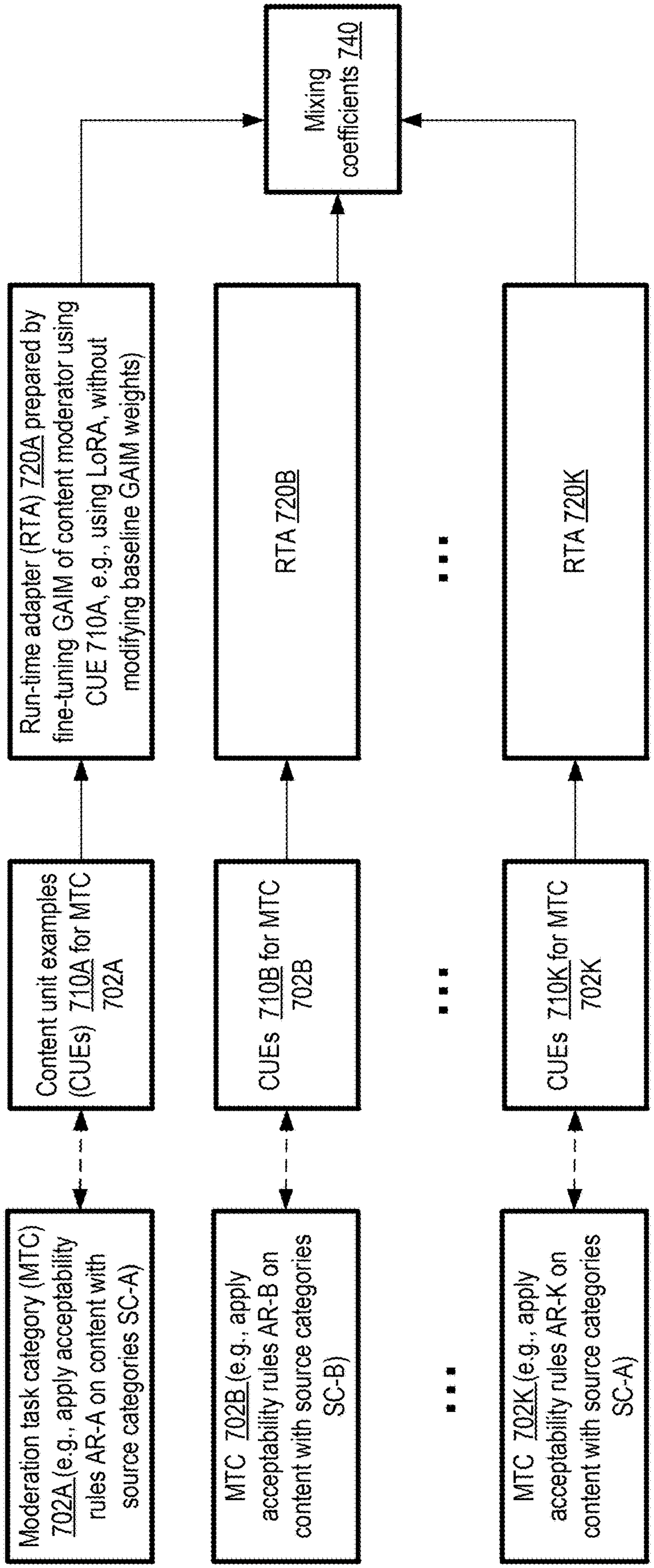
FIG. 7 illustrates an example scenario in which respective run-time adapters for generative AI models (GAIMs) used for content moderators may be generated corresponding to a variety of moderation task categories, according to at least some embodiments.

FIG. 7 illustrates an example scenario in which respective run-time adapters for generative AI models (GAIMs) used for content moderators may be generated corresponding to a variety of moderation task categories, according to at least some embodiments. In the depicted embodiment, the types of tasks expected to be performed by a CM may be divided into a plurality of moderation task categories (MTCs) 702, such as MTC 702A, MTC 702B, and MTC 702K. MTCs may differ from one another based on the moderation policy or set of acceptability rules that are applied, the source categories of the content units (e.g., human-entered text or images vs. AI-generated text or images) that are to be moderated, and/or on other properties. In at least some embodiments, MTCs may be identified or extracted, e.g., by an LLM or GAIM, based on a set of examples of moderation policies or prompt instructions for a version of a CM that was trained or fine-tuned in an enhancement iteration of the kind described above. In other embodiments, the MTCs may be identified or defined via programmatic interfaces by FM owners on whose behalf an MC is to be used.

Corresponding to individual MTCs 702, a respective set of content unit examples (CUEs) 710 may be identified in various embodiments, e.g., from a repository or database of content units that have been used to pre-train or fine-tune one or more CMs. In at least one embodiment, one or more examples of content units corresponding to individual ones of the MTCs may be indicated by an FM owner or administrator via programmatic interfaces. In some embodiments, given one or more examples of content units corresponding to an MTC, additional examples for that MTC may be synthesized by one or more content generators (CGs) of the kind discussed earlier. In the depicted embodiment, CUEs 710A may be identified, obtained or generated corresponding to MTC 702A, CUEs 710B may be identified, obtained or generated corresponding to MTC 702B, and CUEs 710K may be identified, obtained or generated corresponding to MTC 702K.

In various embodiments, respective run-time adapters (RTAs) may be generated or prepared, e.g., by an RTA creation coordinator of an FMS using the CUEs and the GAIM of the CM. In at least one embodiment, the GAIM may be fine-tuned using the CUEs, but the baseline weights of the GAIM may not be changed during the fine-tuning. Instead, values to be included in small auxiliary vectors or matrices may be learned, which can then be used to modify the baseline weights of the GAIM at run-time to enable the GAIM to improve its enforcement of acceptability rules of the MTC corresponding to the CUEs used. In one embodiment, a technique similar to LoRA (Low Rank Adaptation) may be utilized to learn the vectors or matrices. In various embodiments, one or more of the dimensions of the vectors or matrices that are included in the RTAs may be smaller than dimensions of matrices used to store weights of the GAIM which were learned in earlier phases of training or fine-tuning. In the scenario depicted in FIG. 7, RTA 720A may be prepared or learned for MTC 702A and CUE 710A, RTA 720B may be prepared or learned for MTC 702B and CUE 710B, and RTA 720K may be prepared or learned for MTC 702K and CUE 710K.

In at least some embodiments, one or more validation data sets representative of the workload that has been processed by the production version of the CM over some recent time period may be identified after the RTAs have been prepared for each MTC. In a validation phase of the RTA creation process, mixing coefficients 740 may be determined for combining the RTAs for respective types of workloads in the depicted embodiment. In some embodiments, mixing coefficients may not be computed or learned using validation data sets.

Figure 8:
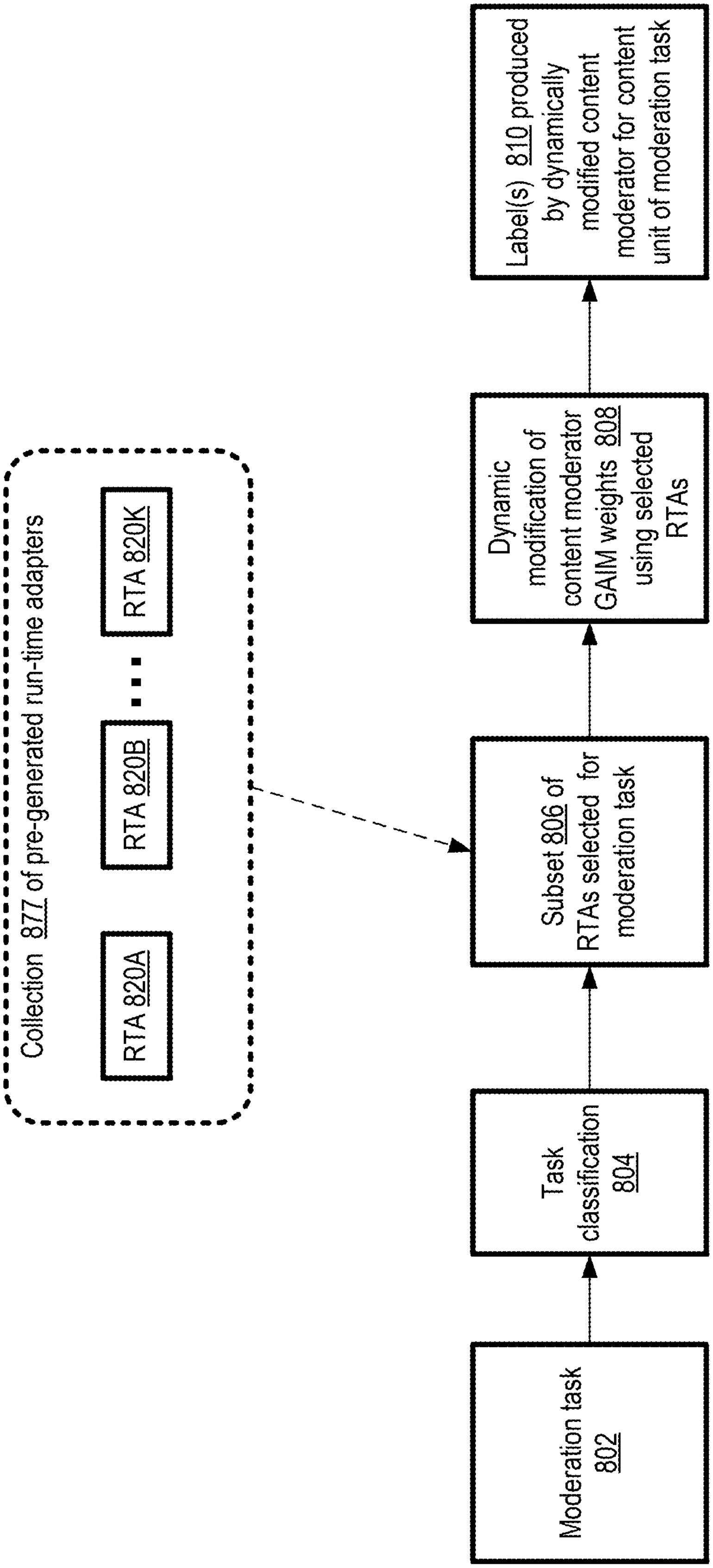
FIG. 8 illustrates an example workflow for dynamically modifying content moderator GAIMs at run-time for preparing labels for content units associated with moderation tasks, according to at least some embodiments.

FIG. 8 illustrates an example workflow for dynamically modifying content moderator GAIMs at run-time for preparing labels for content units associated with moderation tasks, according to at least some embodiments. A collection 877 of pre-generated run-time adapters (RTAs) corresponding to various moderation task categories may be stored, e.g., in a repository of an FMS similar in functionality of FMS 102 of FIG. 1 in various embodiments. Collection 877 may, for example, include RTA 820A, RTA 820B and RTA 820K.

A particular moderation task 802 may be obtained or received at a CM whose learned weights can be modified dynamically using the RTAs, such as a CM deployed in a production environment to moderate inbound and outbound content of a particular FM hosted at an FMS. The moderation task may be received at the CM because an end user of the FM has submitted a prompt, for example, or when the FM prepares a response to an end user's prompt. During task classification 804, properties of the moderation task may be analyzed, e.g., to determine the modes and/or sources of the content unit which is to be moderated.

A subset 806 of RTAs may be selected for the moderation task in the depicted embodiment, e.g., based on the result of the task classification. In one embodiment, for example, a mapping between a set of task classes and respective groups of one or more RTAs may be stored along with the RTAs themselves, and such a mapping may be used to select RTA subsets for various moderation tasks. Note that at least in some embodiments, a given moderation task may be classified as a member of multiple classes, so multiple RTAs may be appropriate for such a task.

Using the selected RTAs, dynamic modification of content moderator GAIM weights 808 may be performed in various embodiments, in effect adapting the GAIM to produce inference results with greater accuracy than if the RTAS had not been used. One or more label(s) 810 may be produced by the dynamically modified CM for the content unit of the moderation task.

In at least some embodiments, the moderation policy which is applied by the CM may indicate filtering strength settings for one or more acceptability rules. Prior to presenting or indicating a label 810 which was generated with the help of one or more RTAs, the CM may verify that a confidence level associated with the label exceeds a threshold in some embodiments. The confidence level for the label may be computed based at least in part on context-dependent probabilities of occurrences of one or more tokens in output produced by the GAIM for the moderation task in one embodiment. In various embodiments, the threshold which is used for verifying that the confidence level is high enough may be computed based at least in part on the filtering strength settings as described below in further detail.

Figure 9:
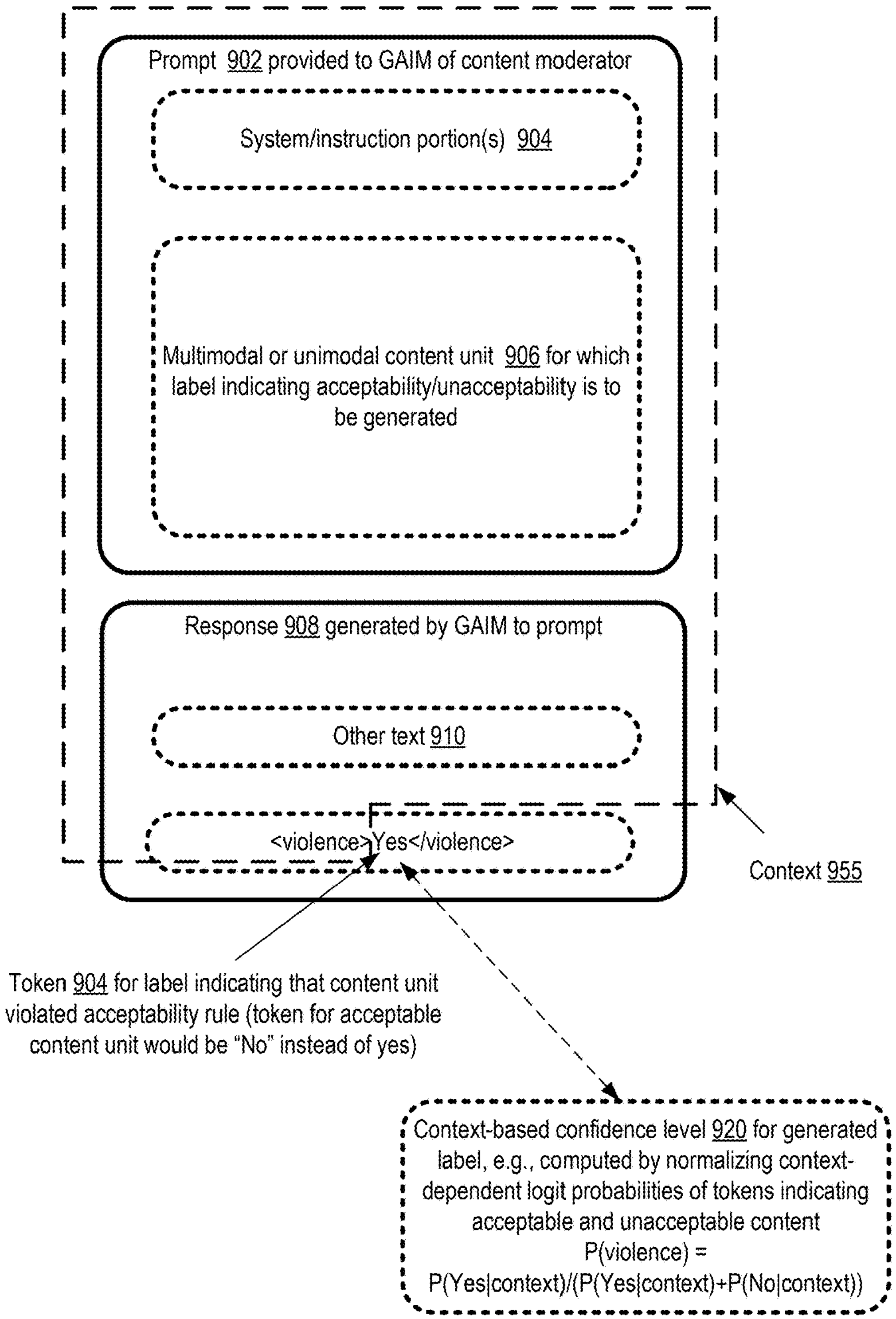
FIG. 9 illustrates an example technique for generating context-based confidence levels for labels generated by a content moderator GAIM, according to at least some embodiments.

FIG. 9 illustrates an example technique for generating context-based confidence levels for labels generated by a content moderator GAIM, according to at least some embodiments. In the depicted embodiment, prompt 902 may be provided to a GAIM of a CM which is to moderate input or output of an FM. Prompt 902 may include a system or instruction portion 904 in which the GAIM is provided guidance about how the GAIM is to prepare a response 908 in the depicted embodiment. The prompt may also include a multimodal or unimodal content unit 906 for which a label indicating acceptability or unacceptability is to be generated by the GAIM.

The response 908 generated by the GAIM may include one or more tokens indicative of the label in the depicted embodiment. For example, if an acceptability rule regarding the presence of violent content in the input prompt is to be applied, a token sequence "<violence>Yes<\violence>" may correspond to a label indicating unacceptability, while a token sequence "<violence>No<\violence>" may correspond to a label indicating acceptability. The response 908 may also comprise other text 910 in some embodiments, e.g., depending on the instruction provided to the GAIM in system/instruction portion(s) 904. The combination of the input prompt and the portion of the response prior to the "Yes" token may represent the context 955 in which the "Yes" token was generated by the GAIM in various embodiments.

In at least one embodiment, a context-based confidence level 920 may be computed for the label generated by the GAIM. For example, in one embodiment, the confidence level may be computed by normalizing context-dependent logit probabilities of the tokens that indicate acceptable and unacceptable content. In at least one embodiment, a logit may indicate the raw, unnormalized outputs of one of the layers of the GAIM, which is converted into probabilities in a subsequent layer. In one implementation, a formula for a context-dependent confidence level associated with a "yes" label (i.e., a label indicating unacceptability) for violence may be expressed as $P(\text{violence})=P(\text{Yes}|\text{context})/(P(\text{Yes}|\text{context})+P(\text{No}|\text{context}))$.

Note that at least in some embodiments, there may be multiple tokens associated with indicating acceptability or unacceptability in the GAIM output. For example, instead of the word "Yes" and "No" for unacceptability and acceptability respectively, abbreviations such as "Y" and "N" may be used, or numerical values such as "1" and "0" may be used. In various embodiments, the probabilities of multiple such tokens may be used to compute the confidence levels, not just a single token for acceptability and a single token for unacceptability.

FIG. 10 illustrates an example scenario in which confidence level thresholds for labels generated by a content moderator of a foundation model may be chosen based on filtering strengths settings for unacceptable subject matter categories, according to at least some embodiments. In the depicted embodiment, filtering strength settings for various unacceptable subject matter categories (USMCs) may be chosen independently of each other, e.g., by an FM owner on whose behalf content units directed to/from an FM is to be moderated and filtered. Three options for filtering strength may be supported by the FMS, "High", "Medium" and "Low". High filtering strengths may be chosen if the FM owner wishes to have a high rate of true positive detection (also referred to as recall) and blocking of unacceptable content, even if this is accompanied by a somewhat higher false positive rate (FPR) than alternative settings. In contrast, a low filtering strength may be chosen if the FM owner wants to have a very low FPR, even if this is accompanied by a somewhat lower recall than alternative settings. A medium filtering strength may be chosen if the FM owner is willing to obtain a recall that is slightly lower than that of the high filtering strength scenario, and is willing to accept a slightly higher FPR than that of the low filtering strength scenario.

In the example scenario shown in table 1005, the FPR targets for low, medium and high filtering strengths for USMC-A are "less than 0.2%", "less than 0.5%" and "less than 1%" respectively, while the recall targets for low, medium and high filtering strengths for USMC-A are "greater than 50%", "greater than 70%" and "greater than 90%" respectively. Different target accuracy metrics may be assigned to a given filtering strength for different USMCs in some embodiments. For example, the FPR target for low filtering strength for USMC B may be set to "less than a %", where "a" differs from 0.2 (the FPR target for USMC-A), the recall target for high filtering strength for USMC C may be set to "greater than f %" where f differs from 90, and so on. In some embodiments, the mappings between filtering strengths and accuracy metric targets may be chosen by an administrator of the FMS. In other embodiments, at least some of the accuracy metrics targets may be specified by the FM owner. In at least one embodiment, instead of specifying low, medium or high filtering strengths, an FM owner may directly specify target accuracy metrics for various USMCs. In some embodiments, accuracy metrics other than FPR and recall may be specified for various USMCs. By default, in one embodiment, the same target metrics may be used for all USMCs associated with a moderation policy.

In various embodiments, CMs may take the target accuracy metrics into account when making a labeling decision for a content unit. For example, if an FM owner has directly or indirectly specified a very low maximum FPR of 0.2%, and the CM determines that the confidence level (e.g., using context-dependent probability of tokens associated with labels as discussed above) for an initially assigned "unacceptable" label for a particular content unit is relatively low (e.g., 51%), the CM may not necessarily label the particular content unit as unacceptable.

In at least some embodiments, a CM may verify, prior to presenting a particular label for a content unit, that a confidence level computed for that label exceeds a threshold 1010. The threshold for a given moderation task's content unit may be dynamically selected, e.g., at run-time of the CM in one embodiment. A validation set may be constructed to represent the distribution of content units of different categories analyzed by a production or primary CM during some time interval in some embodiments. Logits for tokens indicating the labels, and corresponding confidence levels may be computed for the content units of the validation set. An optimization procedure may then be conducted to find the confidence threshold which leads to FPRs and recall closest to the target metrics mapped to the filtering strength settings in at least some embodiments. For individual ones of various classes of the content units of the validation set (where the classes may differ, in one embodiment, in the specific acceptability rules or USMCs, the source categories of the content units, etc.), a respective ROC (receiver operating characteristic) curve may be generated, and the FPR and recall may be computed for individual ones of the points of the ROC curve. From each point, distance to the target FPR and target recall for a filtering strength may be computed, e.g., using the following formula $$\text{distance} = (1 - \exp(-((FRP - \text{target_FPR})^{}2 + (\text{recall} - \text{target_recall})^{}2))$$

Then, a search (e.g., a linear search using an "argmin" function) may be conducted in the distance space to find the optimal threshold in at least some embodiments. Similar optimal thresholds may be identified for all the classes of the content units in one embodiment. When generating an inference response that comprises a particular label for a content unit, the CM may verify that the confidence level for that label meets or exceeds a threshold which corresponds to the class of the content unit and the sensitivity strength based accuracy performance targets for the content unit in various embodiments.

Figure 11:
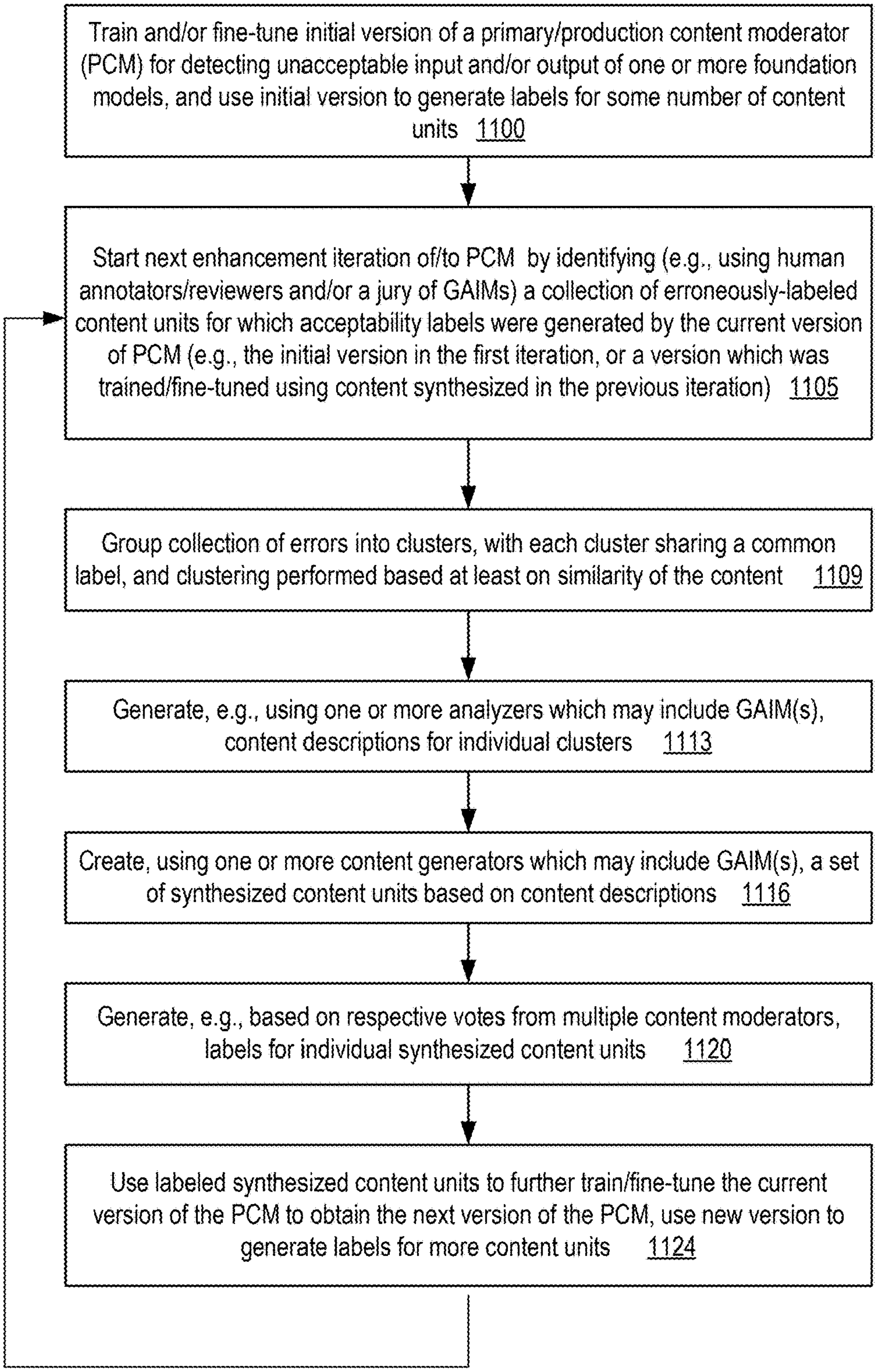
FIG. 11 is a flow diagram illustrating aspects of operations which may be performed to iteratively enhance content moderator models using synthesized content units, according to at least some embodiments.

FIG. 11 is a flow diagram illustrating aspects of operations which may be performed to iteratively enhance content moderator models using synthesized content units, according to at least some embodiments. As shown in element 1100, an initial version of a primary CM (e.g., a CM used in production) for detecting unacceptable input and/or output of one or more foundation models may be trained and/or fine-tuned in the depicted embodiment. The initial version may be used to generate labels for some number of content units in various embodiments. In at least one embodiment, a number of CMs (which may differ from one another in the GAIM architecture used) may be trained and/or fine-tuned, e.g. using different groups of training data, and this pool of multiple CMs may be used during the enhancement iterations of the PCM. In one embodiment, from among the collection of CMs, one (which performs the best on a validation data set) may be chosen as the PCM, while the others may be designated as auxiliary or secondary PCMs to be used in some phases of the PCM's enhancement iterations.

The next enhancement iteration of or to the PCM may be started by identifying a collection of erroneously-labeled content units for which the labels were generated by the current version of the PCM (element 1105) in various embodiments. The errors in labeling may be identified, for example, with the help of one or more human reviewers, a jury of GAIMs, and/or a combination of human reviewers and GAIMs in different embodiments. In the first enhancement iteration, the current version may comprise the PCM version which was trained in operations corresponding to element 1100. In the second iteration and subsequent iterations, the current version may comprise a version of the PVM which was trained or fine-tuned using content units synthesized in the previous iteration. In some embodiments, if no errors are detected in the labels generated by the current version of the PCM over a long period, the iterative enhancement iterations may be terminated.

In at least some embodiments, the erroneously labeled content items may be grouped or organized into clusters, e.g., by an analyzer which may include one or more AI models (element 1109). Each cluster may comprise content units to which the same (erroneous) label was assigned in the depicted embodiment, and content units may be placed into a given cluster based at least in part on similarity of their content relative to one another in at least one embodiment.

After the content units have been grouped into the clusters, in various embodiments, a set of content descriptors (e.g., comprising text descriptions indicating common features of the content units of the clusters) may be generated for individual ones of the clusters (element 1113). In at least some embodiments, such content descriptors may be generated by one or more analyzers which may include one or more GAIMs.

The content descriptors may be provided as input to one or more content generators (CGs) in the depicted embodiment. Based at least in part on the content descriptors, the CGs may create a set of synthesized content units in various embodiments (element 1116) corresponding to individual ones of the clusters.

In at least some embodiments, labels (e.g., acceptability/unacceptability labels in accordance with one or more moderation policies or acceptability rules) for individual ones of the synthesized content units may be obtained or generated (element 1120). In one embodiments, the labels may be generated based on consensus or voting by a plurality of CMs (including the current version of the PVM in some cases). Multiple CMs may be used in such embodiments to incorporate different perspectives regarding the synthesized content units, instead of relying on analysis by a single CM which may be prone to errors of a particular type.

The labeled synthesized content units corresponding to different clusters may be used to further train or fine-tune the current version of the PCM to obtain the next version of the PCM in various embodiments (element 1124). As such, the current version may be transformed to the next version by training the current version on the synthesized content units in such embodiments. This next version of the PCM may be used to generate labels for additional content units (e.g., content units submitted by end users in prompts directed to the FM(s) for which the PCM is deployed, and/or content units in the responses generated by such FMs to end user prompts). From among these additional labels, erroneous labels (if any) may be identified and used to start the next enhancement iteration (element 1105) of the PCM in the depicted embodiment. In various embodiments, at least some of the content units for which the PCM generates an erroneous or incorrect label may be more difficult to analyze, and/or closer to the boundary between acceptability and unacceptability. By using such difficult content units as examples for which similar content units are synthesized and then labeled for training the PCM, the PCM may be continuously improved in such embodiments.

Figure 12:
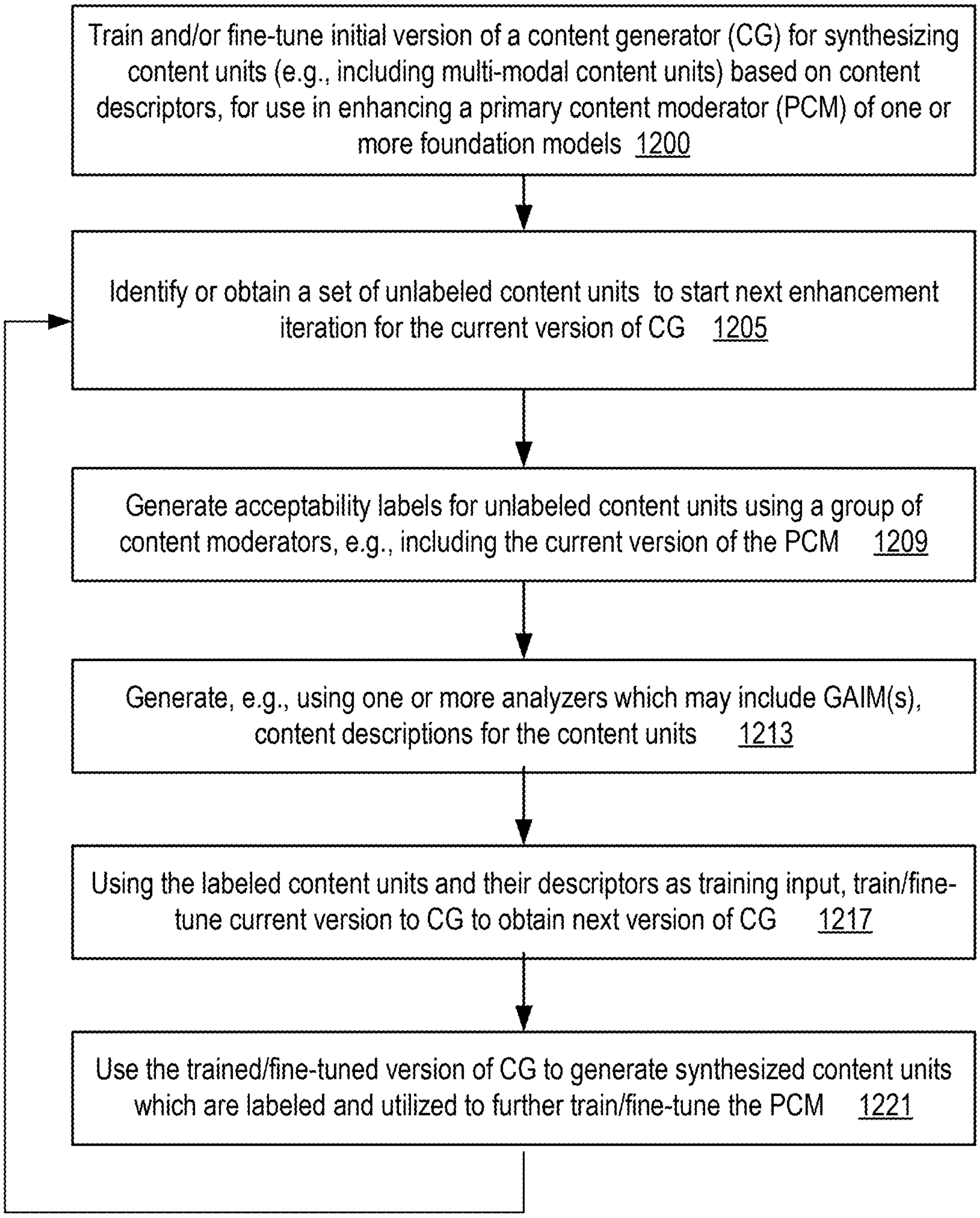
FIG. 12 is a flow diagram illustrating aspects of operations which may be performed to iteratively enhance content generators whose synthesized content is utilized to enhance content generators, according to at least some embodiments.

FIG. 12 is a flow diagram illustrating aspects of operations which may be performed to iteratively enhance content generators whose synthesized content is utilized to enhance content generators, according to at least some embodiments. As shown in element 1200, an initial version of a content generator (CG), which may comprise one or more GAIMs including a diffusion model may be trained and/or fine tuned to synthesize content units based on content descriptors provided as input. The synthesized content units may be utilized, for example, to enhance a primary content moderator (PCM) of one or more foundation models in some embodiments, e.g., in iterative PCM enhancement iterations of the kind shown in FIG. 11. In at least some embodiments, at least a subset of the content units that are synthesized by the CG may be multimodal, e.g., in that they may include respective text and non-text portions. Some of the synthesized content units may comprise no text, but may include one or more non-text portions.

A set of unlabeled content units relevant to content moderation tasks may be identified or obtained (e.g., from one or more repositories of multi-modal content, such as public databases, private databases of FM owners and the like) to start the next enhancement iteration of the CG (element 1205) in various embodiments. Acceptability labels in accordance with a moderation policy or acceptability rule may be generated for individual ones of the unlabeled content units, e.g., by a plurality or group of CMs including the current version of the PCM in the depicted embodiment (element 1209). In at least one embodiment, a voting procedure may be used to generate the labels, in which individual CMs may cast respective label votes for a given content unit, and the labels with the most votes may be chosen for the content units.

Respective content descriptors may be generated for individual ones of the labeled content units (element 1213), e.g., using one or more analyzers which include one or more GAIMs in some embodiments. Using the labeled content units and their descriptors as training input, the current version of the CG may be trained or fine-tuned to obtain the next version of the CG (element 1217) in the depicted embodiment. As such, the current version of the CG may be transformed to the next version by training the current version on a training set comprising the labeled content units and their descriptors. The new trained or fine-tuned version of the CG may be used to generate synthesized content units which are labeled and utilized to further train or fine-tune the PCM in various embodiments (element 1221). The operations of elements 1205, 1209, 1213, 1217 and 1221 may be repeated for the next enhancement iteration of the CG in various embodiments.

Figure 13:
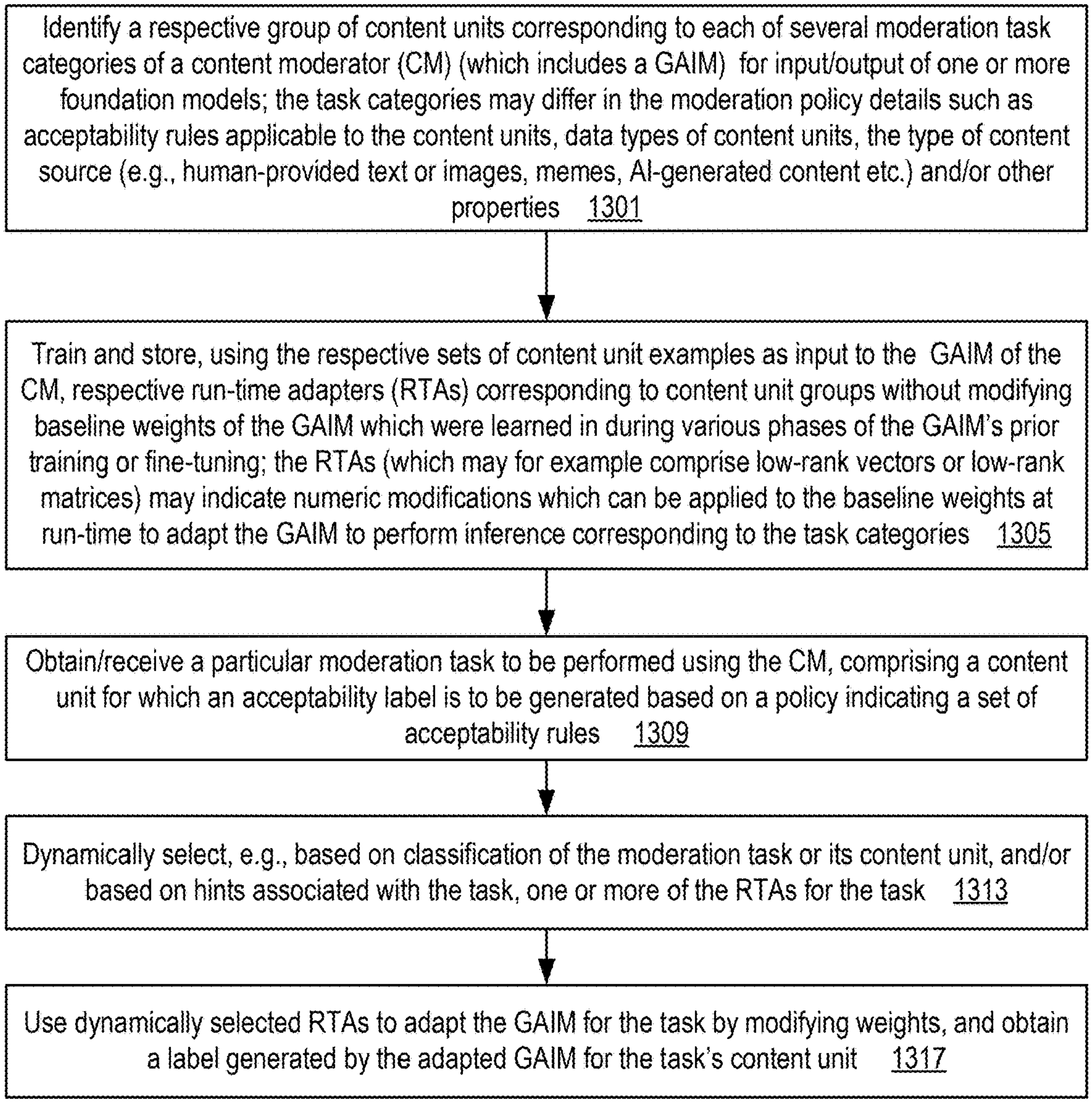
FIG. 13 is a flow diagram illustrating aspects of operations which may be performed to dynamically adapt content moderator GAIMs at run-time, according to at least some embodiments.

FIG. 13 is a flow diagram illustrating aspects of operations which may be performed to dynamically adapt content moderator GAIMs at run-time, according to at least some embodiments. As shown in element 1301, a plurality of groups of content units, each group corresponding for example to a distinct moderation task category of a CM which includes a GAIM, may be identified or obtained in various embodiments. The CM may be configured to generate moderation labels (e.g., labels indicating acceptability or unacceptability) of individual content units based on applicable acceptability rules of moderation policies similar to the policies discussed earlier in the depicted embodiment. The content units for which the CM is to generate labels may comprise input (e.g., user-submitted prompts) and/or output (responses generated by the CM's GAIM) of one or more foundation models of an FMS similar in functionality of FMS 102 of FIG. 1 in various embodiments. The moderation task categories (and the corresponding groups of content units) may differ from one another in properties such as the set of applicable acceptability rules/policies, the data types of the content units, the categories of content sources (e.g., humans vs AI models), and so on in some embodiments.

Using the respective groups of content units as input to the GAIM, a plurality of run-time adapters (RTAs) for the GAIM may be trained and stored in various embodiments (element 1305). In one embodiment, the CM for whose GAIM the RTAs are trained/learned may, for example, comprise one of the versions that was generated in a particular iterative enhancement iteration of the kind described earlier. A given RTA may, for example, comprise one or more matrices or vectors, with the matrices or vectors having at least dimension which is smaller than a corresponding dimension of a weight matrix learned for the GAIM during earlier phases/stages of training or fine-tuning of the GAIM; such smaller-dimension vectors or matrices may be referred to as low-rank vectors or matrices in at least some embodiments. A matrix or vector of a given RTA may comprise learned numerical values which can be used to modify weights of the GAIM at run-time to adapt the GAIM for preparing higher-quality inference results on input content units similar to the content unit group for which the RTA was generated in various embodiments. Individual RTAs may be prepared or trained without modifying baseline weights of the GAIM, which were learned during earlier training or fine-tuning stages or phases of the GAIM in the depicted embodiment; such earlier-learnt weights may be kept fixed or frozen. The RTAs may collectively perform a wide variety of types of weight manipulations on the GAIM in different embodiments. For example, in some embodiments, a subset of the weights of the GAIM may be increased to increase the importance assigned to a particular subset of language tokens or image pixels of the input content unit corresponding to a violation of a particular acceptability rule or a particular unacceptable subject matter, without modifying weights that the GAIM uses for more general language interpretation or more general image modification. In at least one embodiment, an RTA may be used to decrease or increase earlier-learned weights associated with a transformer module or unit of the GAIM. In some embodiments, an RTA may increase or decrease weights associated with a convolution layer of the GAIM.

After the RTAs have been generated, e.g., in a particular phase of fine-tuning of the CM, the CM may be deployed to generate labels for input or output of an FM in various embodiments. An indication of a particular moderation task may be received or obtained at the CM after deployment in the depicted embodiment (element 1309). The moderation task may comprise or indicate a particular content unit for which a moderation label or acceptability label is to be generated in accordance with one or more acceptability rules of a moderation policy.

A subset of the earlier-generated and stored RTAs, comprising one or more of the RTAs, may be dynamically selected for the particular moderation task and/or its content unit in various embodiments (element 1313). In some embodiments, the moderation task and/or its content units may be classified, and results of the classification may be used to select the appropriate subset of RTAs. In at least one embodiment, one or more attributes of the content units may be used to select the subsets of the RTAs. In at least one embodiment, one or more hints associated with the particular content moderation task or its content unit may be provided to the CM (e.g., via programmatic interfaces of the FMS by an authorized user such as an FM owner), and the hints may be used to select the subset of RTAs.

The dynamically selected subset of RTAs may be used to modify one or more weights of the GAIM (element 1317) in the depicted embodiment. The adapted/modified GAIM may be used to generate the label for the content item of the moderation task in various embodiments. Depending on the label, in at least some embodiments the content unit may be sent on to its intended destination (e.g., an FM in the case where the content unit is part of an input prompt from an FM end user, and the FM end user in the case where the content unit is generated by the FM in response to a prompt). In at least some embodiments, respective coefficients selected during a validation phase performed after the RTAs were generated may be applied to different RTAs before their values are used to modify the weights of the GAIM.

Figure 14:
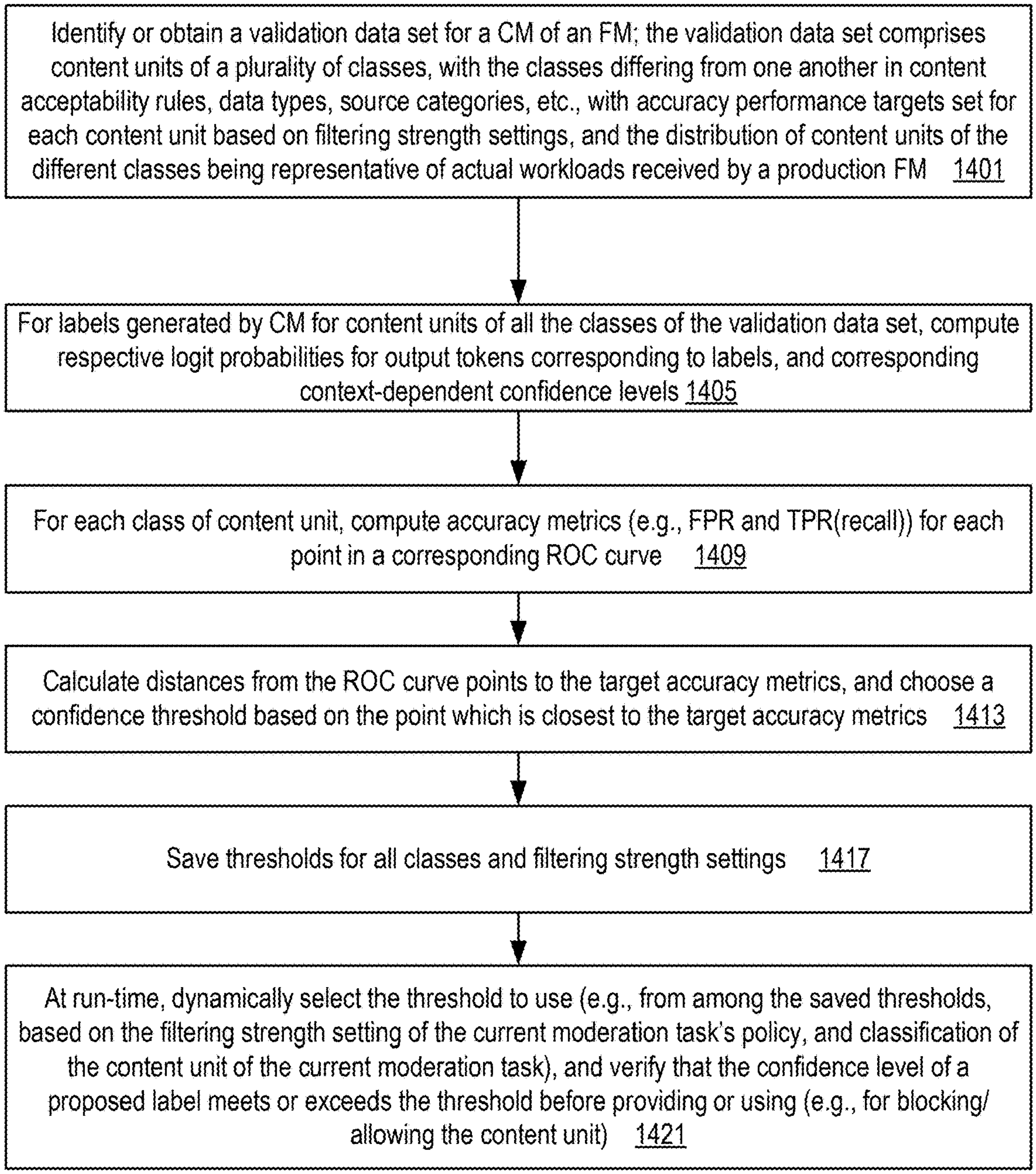
FIG. 14 is a flow diagram illustrating aspects of operations which may be performed to determine confidence level thresholds for content moderation labels, according to at least some embodiments.

FIG. 14 is a flow diagram illustrating aspects of operations which may be performed to determine confidence level thresholds for content moderation labels, according to at least some embodiments. A validation data set may be identified or obtained for a CM of an FM (element 1401). The validation data set may comprise content units of a plurality of classes, with the classes differing from one another based for example on the applicable acceptability rules, data types, content source categories and/or other properties in the depicted embodiment. Accuracy metrics performance targets (e.g., targets for false positive rate (FPR), true positive rate (TPR) or recall) may be set for individual content units based for example on filtering strength settings in various embodiments. The distribution of content units and classes may be chosen such that the classes are representative of (or similar in distribution to) actual workloads that have been directed to a production CM in at least some embodiments.

Corresponding to labels generated by the CM for content units of all the classes represented in the validation data set, respective logit-based probabilities for selected output tokens produced by a GAIM of the CM may be computed in various embodiments, along with corresponding confidence levels (element 1405). For each class on content unit, the accuracy metrics may be computed (element 1409) corresponding to individual ones of the points used to generate an ROC curve or plot for the class in the depicted embodiment (element 1413).

Respective distances between the points on the ROC curve and points representing the target accuracy metrics may be computed in some embodiments (element 1413). The point which is found to be closest to the target accuracy metrics may be identified, and used to set a confidence threshold for the class and the filtering strength settings corresponding to the target accuracy metrics. The confidence threshold thus computed using the validation data set may be stored (element 1417), e.g., in a repository of an FMS similar in features and functionality to FMS 102 of FIG. 1 in the depicted embodiment.

At run-time, when a label is to be generated for a particular content unit of a particular moderation task in accordance with an associated moderation policy or acceptability rule with specified filtering strength settings, the confidence threshold to use for the label may be dynamically selected in the depicted embodiment (element 1421). For example, the threshold may be selected from among the saved thresholds in one embodiment based at least in part on the classification of the content unit and/or based on the filtering strength settings. The CM may verify that the confidence level of a proposed label it generates is equal to or greater than the dynamically-selected threshold in at least some embodiments, prior to providing or using the proposed label, e.g., to block or allow the corresponding content unit.

It is noted that in various embodiments, some of the operations shown in the flow diagrams of FIG. 11, FIG. 12, FIG. 13 and/or FIG. 14 may be implemented in a different order than that shown in the figure, or may be performed in parallel rather than sequentially. Additionally, some of the operations shown in the flow diagrams may not be required in one or more implementations.

Figure 15:
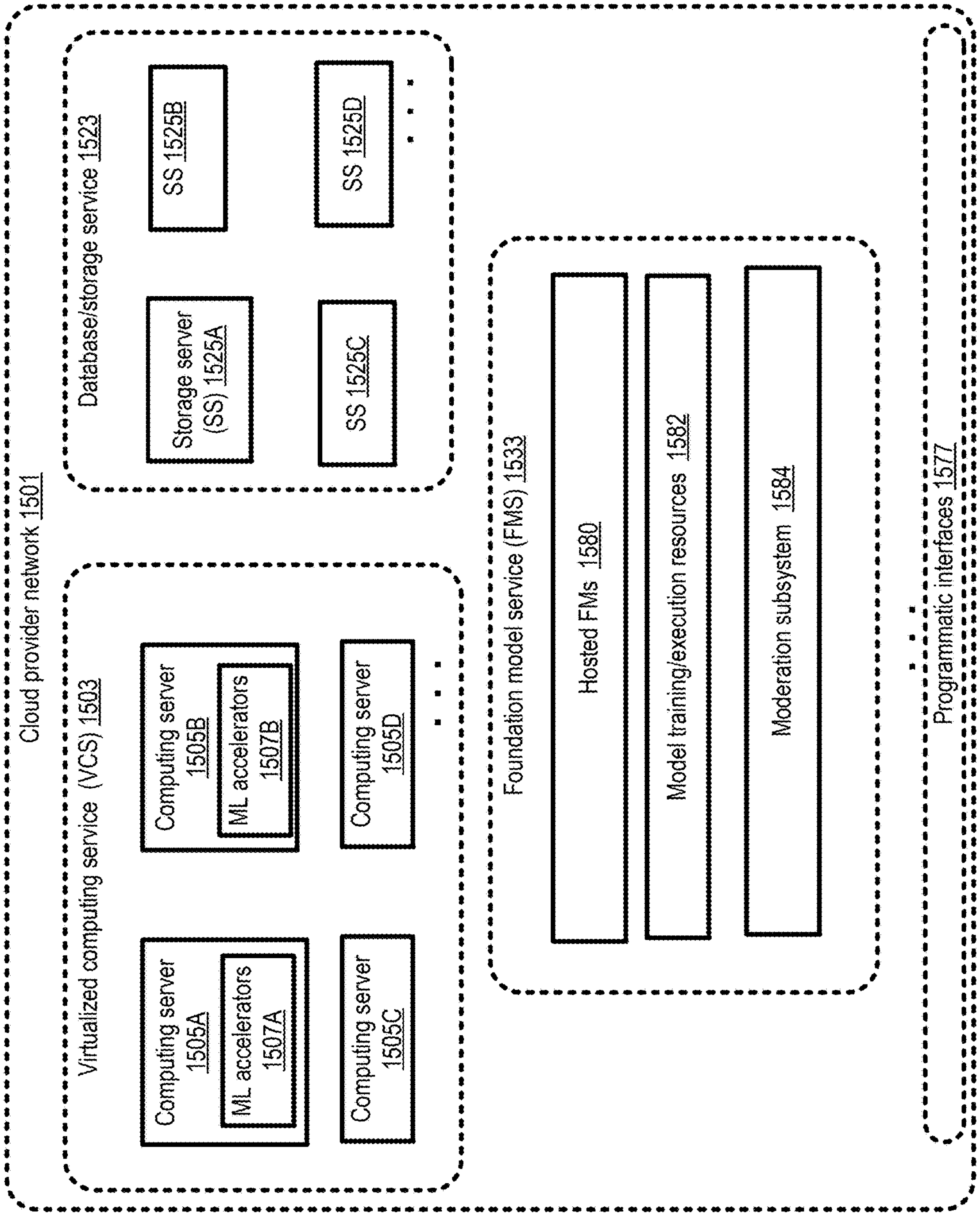
FIG. 15 illustrates an example provider network at which a foundation model service which includes a content moderation subsystem may be implemented, according to at least some embodiments.

FIG. 15 illustrates an example provider network at which a foundation model service which includes a content moderation subsystem may be implemented, according to at least some embodiments. In the depicted embodiment, cloud provider network 1501 may comprise resources used to implement a plurality of network-accessible services, including for example a virtualized computing service (VCS) 1503, a database/storage service 1523, and a foundation model service (FMS) 1533. In some embodiments the FMS may be implemented as part of a more general generative AI service or machine learning service. The FMS 1533 may comprise a collection of hosted FMs 1580, model training/execution resources 1582, and a moderation subsystem 1584 similar in features and functionality of moderation subsystem 145 of FIG. 1.

In the embodiment shown in FIG. 15, the VCS may comprise a plurality of servers (e.g., servers 1505A, 1505B, 1505C or 1505D). Respective groups of compute instances or virtual machines may be run on individual ones of the computing servers at the request of provider network clients. At least some of the servers may include a set of machine learning (ML) accelerators such as ML accelerator 1507A or ML accelerator 1507B, which can be used for speeding up training or fine tuning machine learning models, and/or for speeding up execution of machine learning models. Instead of using its own separate training and/or execution resources, FMS 1533 may utilize VCS computing servers equipped with ML accelerators to train, fine-tune and run FMs and/or AI models of moderation subsystem 1584 (including models used in continuous enhancement iterations for content moderators and/or content generators) in some embodiments. Training data sets used for hosted FMs and/or models of the moderation subsystem may be stored at storage servers (SSs) of database/storage service 1523, such as SS 1525A, 1525B, 1525C or 1525D. Components of a given service of a provider network may thus in general utilize components of other services in the depicted embodiment. Individual ones of the services shown in FIG. 15 may implement a respective set of programmatic interfaces 1577 which can be used by external and/or internal clients (where the internal clients may comprise components of other services) in one embodiment. In at least some embodiments, resources of a cloud provider network may not be required for the kinds of techniques introduced above; instead, for example, a standalone set of resources may be used.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, an FMS may be implemented at least in part using an edge location of the provider network instead of or in addition to regional data centers. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as provider network extension sites or local zones (due to being more local or proximate to a group of users than traditional availability zones). A local zone may be connected in various ways to a publicly accessible network such as the Internet, for example directly, via another network, or via a private connection to a region. In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network.

A VCS of the cloud provider network may offer virtual compute instances (also referred to as virtual machines, or simply "instances") with varying computational and/or memory resources in various embodiments, which may be used to implement components of an FMS. In one embodiment, each of the virtual compute instances may correspond to one of several instance types, families or categories, and instances of any of several families may be employed for computations of the FMS. An instance type may be characterized by its hardware type, computational resources (e.g., number, type, and configuration of central processing units (CPUs) or CPU cores, GPUs, ML accelerators or hardware accelerators for other types of tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The traffic and operations of the cloud provider network, and individual services such as the FMS, may broadly be subdivided into two categories in various embodiments: control plane operations and data plane operations. While the data plane represents the movement of data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Figure 16:
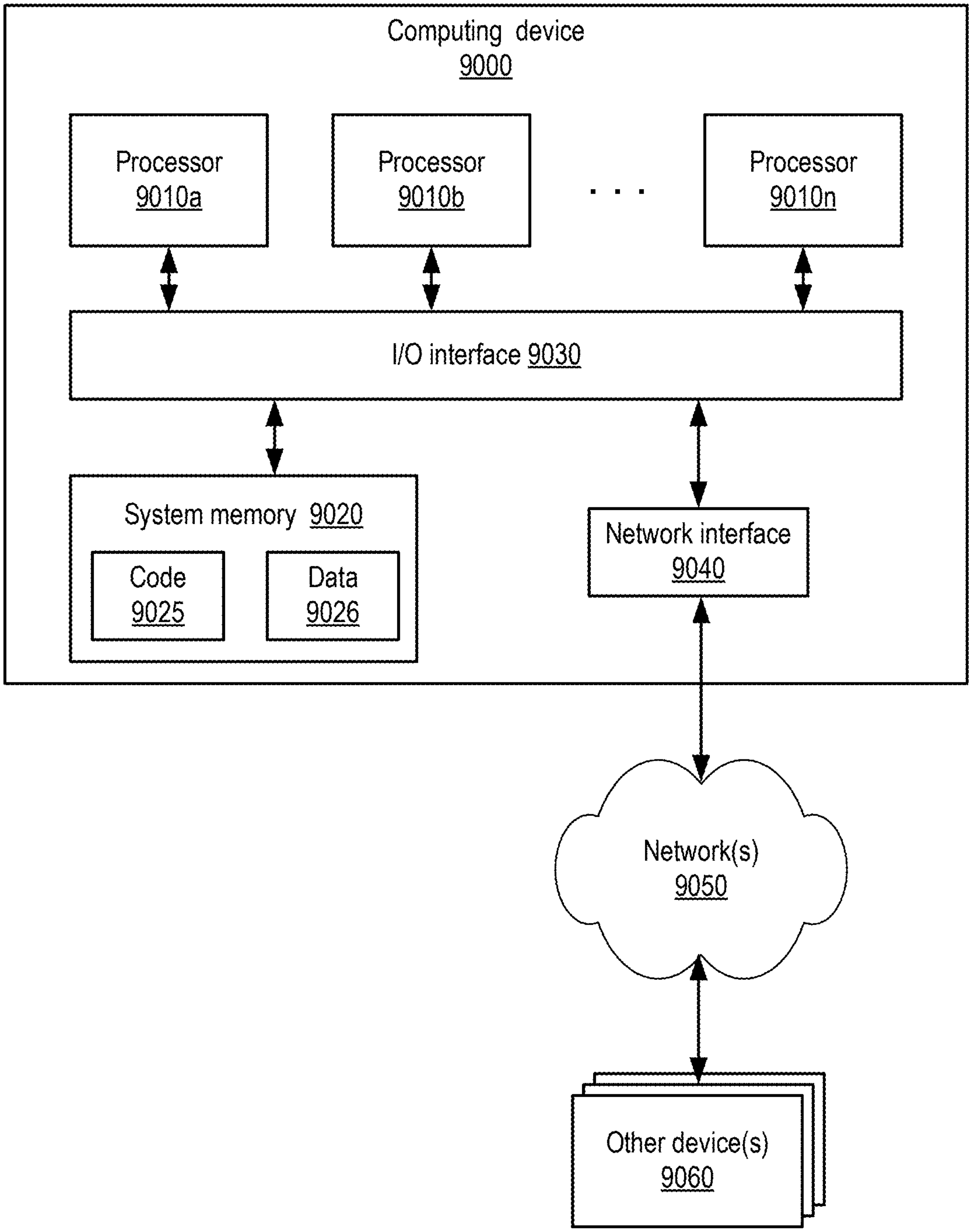
FIG. 16 is a block diagram illustrating an example computing device that may be used in at least some embodiments.

In at least some embodiments, a server that implements the types of techniques described herein (e.g., including the described functionality of various FMS components and components of other services of cloud provider networks), may include a general-purpose computer system that includes or is configured to access one or more computer-accessible media. FIG. 16 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 15, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 15. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices;

wherein the one or more computing devices include instructions that upon execution on or across the one or more computing devices cause the one or more computing devices to:

conduct multiple enhancement iterations to a content moderator which comprises at least one generative artificial intelligence model, wherein a particular enhancement iteration comprises:

grouping a collection of erroneously labeled content units into a plurality of clusters, wherein labels for individual content units of the collection were assigned by a first version of the content moderator, wherein an individual label assigned to a particular content unit indicates whether the particular content unit violates one or more acceptability rules, wherein content units within a cluster of the plurality of clusters have a common erroneous label;

generating, using at least a first content descriptor of the cluster, one or more synthesized content units including a first synthesized content unit;

transforming, by training on at least the one or more synthesized content units, the first version of the content moderator to a second version of the content moderator, wherein a label for the first synthesized content unit is determined using a plurality of content moderators; and obtaining, from the second version of the content moderator, an additional set of labeled content units from which another collection of erroneously labeled content units can be selected for grouping into clusters in a subsequent enhancement iteration.

2. The system as recited in claim 1, wherein the one or more synthesized content units are generated by one or more content generators which include at least one generative artificial intelligence model (GAIM), and wherein the one or more computing devices include further instructions that upon execution on or across the one or more computing devices cause the one or more computing devices to:

perform a plurality of enhancement iterations to a content generator of the one or more content generators, wherein a particular enhancement iteration to the content generator comprises:

transforming a first version of the content generator to a second version by training the first version of the content generator on a training set which includes one or more of: (a) a plurality of content units to which labels have been assigned, in accordance with the one or more acceptability rules, using a plurality of content moderators including a version of the content moderator and (b) respective content descriptors generated for individual content units of the plurality of content units, wherein synthesized content units generated by the second version of the content generator are used to train the content moderator in an enhancement iteration to the content moderator.

3. The system as recited in claim 1, wherein the one or more computing devices include further instructions that upon execution on or across the one or more computing devices cause the one or more computing devices to:

generate the first content descriptor using one or more generative artificial intelligence models.

4. The system as recited in claim 1, wherein the one or more computing devices include further instructions that upon execution on or across the one or more computing devices cause the one or more computing devices to:

obtain, via one or more programmatic interfaces, an indication of the one or more acceptability rules.

5. The system as recited in claim 1, wherein a particular acceptability rule of the one or more acceptability rules indicates at least a subject matter category of content which is unacceptable, wherein the subject matter category comprises content pertaining to one or more of: (a) violence, (b) hate, (c) insults, (d) misconduct or (e) prompt attacks.

6. A computer-implemented method, comprising:

performing a plurality of enhancement iterations to a content moderator which comprises at least one artificial intelligence model, wherein a particular enhancement iteration comprises:

generating, based at least in part on analysis of a collection of erroneously labeled content units, one or more synthesized content units including a first synthesized content unit, wherein labels for individual content units of the collection were assigned, in accordance with one or more acceptability rules, by a first version of the content moderator;

transforming the first version of the content moderator to a second version by training the first version on at least the one or more synthesized content units, wherein a label for the first synthesized content unit is determined using a plurality of content moderators, and wherein the first synthesized content unit is synthesized using a first content descriptor generated in the analysis of the collection of erroneously labeled content units; and obtaining, from the second version of the content moderator, an additional set of labeled content units from which another collection of erroneously labeled content units can be identified for analysis in a subsequent enhancement iteration.

7. The computer-implemented method as recited in claim 6, wherein said generating is performed by one or more content generators which include at least one generative artificial intelligence model (GAIM), the computer-implemented method further comprising:

performing a plurality of enhancement iterations to a content generator of the one or more content generators, wherein a particular enhancement iteration of the content generator comprises:

transforming a first version of the content generator to a second version by training the first version on a training set which includes one or more of: (a) a plurality of content units to which labels have been assigned, in accordance with the one or more acceptability rules, using a plurality of content moderators including a version of the content moderator and (b) respective content descriptors generated for individual content units of the plurality of content units, wherein synthesized content units generated by the second version of the content generator are used to train the content moderator in an enhancement iteration to the content moderator.

8. The computer-implemented method as recited in claim 6, further comprising:

performing the analysis of the collection of erroneously labeled content units, wherein said performing the analysis comprises:

grouping the collection of erroneously labeled content units into a plurality of clusters, wherein a label assigned to a content unit indicates whether the content unit violates one or more acceptability rules, wherein content units of a cluster of the plurality of clusters have a common erroneous label, and wherein said grouping is based at least in part on similarity of content; and generating, using one or more generative artificial intelligence models (GAIMs), a respective content descriptor for individual ones of the clusters, wherein the respective content descriptors include the first content descriptor, and wherein the respective content descriptors are provided as input to one or more content generators to synthesize the one or more synthesized content units.

9. The computer-implemented method as recited in claim 6, further comprising:

selecting, from a data source, using the first content descriptor, one or more other content units to train the first version of the content moderator to obtain the second version.

10. The computer-implemented method as recited in claim 6, wherein said training the first version of the content moderator to obtain the second version comprises:

obtaining a content unit from a data source to train the first version of the content moderator.

11. The computer-implemented method as recited in claim 6, wherein a particular acceptability rule of the one or more acceptability rules has an associated filtering strength setting to be used to generate labels identifying content units as unacceptable.

12. The computer-implemented method as recited in claim 6, wherein the first synthesized content unit comprises one or more of: (a) text, (b) an image, (c) a video or (d) audio.

13. The computer-implemented method as recited in claim 6, wherein said generating the one or more synthesized content units comprises utilizing at least a diffusion model.

14. The computer-implemented method as recited in claim 6, further comprising:

deploying a particular version of the content moderator to assign labels to content units comprising one or more of: (a) input prompts directed to an artificial intelligence model hosted at a cloud computing environment or (n) outputs generated by an artificial intelligence model hosted at a cloud computing environment.

15. The computer-implemented method as recited in claim 6, wherein the one or more synthesized content units comprise one or more of: (a) a synthesized content unit which is unacceptable in accordance with an acceptability rule of the one or more acceptability rules or (b) a synthesized content unit which is acceptable in accordance with a acceptability rule of the one or more acceptability rules.

16. One or more non-transitory computer-accessible storage media storing program instructions that when executed on or across one or more processors:

perform a plurality of enhancement iterations to a content moderator which comprises at least one artificial intelligence model, wherein a particular enhancement iteration comprises:

generating, based at least in part on analysis of a collection of erroneously labeled content units, one or more synthesized content units including a first synthesized content unit, wherein labels for individual content units of the collection were assigned, in accordance with one or more acceptability rules, by a first version of the content moderator;

transforming the first version of the content moderator to a second version by training the first version on at least the one or more synthesized content units, wherein a label for the first synthesized content unit is determined using a plurality of content moderators, and wherein the first synthesized content unit is synthesized using a first content descriptor generated in the analysis of the collection of erroneously labeled content units; and obtaining, from the second version of the content moderator, an additional set of labeled content units from which another collection of erroneously labeled content units can be identified for analysis in a subsequent enhancement iteration.

17. The one or more non-transitory computer-accessible storage media as recited in claim 16, wherein the one or more synthesized content units are generated by one or more content generators which include at least one generative artificial intelligence model (GAIM), the one or more non-transitory computer-accessible storage media storing further program instructions that when executed on or across the one or more processors:

perform a plurality of enhancement iterations to a content generator of the one or more content generators, wherein a particular enhancement iteration of the content generator comprises:

transforming a first version of the content generator to a second version by training the first version on a training set which includes one or more of: (a) a plurality of content units to which labels have been assigned, in accordance with the one or more acceptability rules, using a plurality of content moderators including a version of the content moderator and (b) respective content descriptors generated for individual content units of the plurality of content units, wherein synthesized content units generated by the second version of the content generator are used to train the content moderator in an enhancement iteration to the content moderator.

18. The one or more non-transitory computer-accessible storage media as recited in claim 16, storing further program instructions that when executed on or across the one or more processors:

determine, based at least in part on input obtained via one or more programmatic interfaces from a label reviewer, that a particular label assigned to a particular content unit by the first version of the content moderator is erroneous; and including, based at least in part on said determining, the particular content unit in the collection of erroneously labeled content units.

19. The one or more non-transitory computer-accessible storage media as recited in claim 16, storing further program instructions that when executed on or across the one or more processors:

perform the analysis of the collection of erroneously labeled content units, wherein the analysis comprises:

grouping the collection of erroneously labeled content units into a plurality of clusters, wherein a label assigned to a content unit indicates whether the content unit violates one or more acceptability rules, wherein content units of a cluster of the plurality of clusters have a common erroneous label, and wherein said grouping is based at least in part on similarity of content; and generating, using one or more generative artificial intelligence models, a respective content descriptor for individual ones of the clusters, wherein the respective content descriptors are provided as input to one or more content generators to synthesize the one or more synthesized content units.

20. The one or more non-transitory computer-accessible storage media as recited in claim 16, wherein a particular acceptability rule of the one or more acceptability rules indicates at least a subject matter category of content which is unacceptable, wherein the subject matter category comprises content pertaining to one or more of: (a) violence, (b) hate, (c) insults, (d) misconduct or (e) prompt attacks directed to one or more generative artificial intelligence models.

* * * * *